US012445619B2

(12) United States Patent
Koo et al.

(10) Patent No.: US 12,445,619 B2
(45) Date of Patent: Oct. 14, 2025

(54) IMAGE CODING METHOD AND DEVICE THEREFOR

(71) Applicant: LG Electronics Inc., Seoul (KR)

(72) Inventors: Moonmo Koo, Seoul (KR); Jie Zhao, Seoul (KR); Seunghwan Kim, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/919,674

(22) PCT Filed: May 11, 2021

(86) PCT No.: PCT/KR2021/005837

§ 371 (c)(1),
(2) Date: Oct. 18, 2022

(87) PCT Pub. No.: WO2021/230602

PCT Pub. Date: Nov. 18, 2021

(65) Prior Publication Data

US 2023/0143945 A1 May 11, 2023

Related U.S. Application Data

(60) Provisional application No. 63/023,229, filed on May 11, 2020.

(51) Int. Cl.
*H04N 19/70* (2014.01)
*H04N 19/132* (2014.01)
(Continued)

(52) U.S. Cl.
CPC ......... *H04N 19/132* (2014.11); *H04N 19/159* (2014.11); *H04N 19/176* (2014.11); *H04N 19/46* (2014.11); *H04N 19/70* (2014.11)

(58) Field of Classification Search
CPC .. H04N 19/132; H04N 19/159; H04N 19/176; H04N 19/46; H04N 19/70
(Continued)

(56) References Cited

U.S. PATENT DOCUMENTS 10,225,579 B2 3/2019 Lin
2022/0094947 A1* 3/2022 Ma ....................... H04N 19/103
(Continued)

FOREIGN PATENT DOCUMENTS

KR 20180120200 11/2018
KR 20200028860 3/2020
KR 102099626 4/2020

OTHER PUBLICATIONS

Bross et al., "Versatile Video Coding (Draft 9)," Joint Video Experts Team (JVET) of ITU-T SG 16 WP 3 and ISO/IEC JTC 1/SC 29/WG 11, Document: JVET-R2001-v8, 18th Meeting: by teleconference, Apr. 15-24, 2020, 524 pages.

*Primary Examiner* — Albert Kir
(74) *Attorney, Agent, or Firm* — Fish & Richardson P.C.

(57) ABSTRACT

An image decoding method according to the present document comprises the steps of: receiving an intra-MIP syntax element for a first target block; deriving the value of the intra-MIP syntax element; setting a variable MIP flag for the preset specific area, which is the same as the area of the first target block, on the basis of the value of the intra-MIP syntax element; deriving an intra-prediction mode of the second target block on the basis of the variable MIP flag; and deriving a prediction sample of the second target block on the basis of the intra-prediction mode of the second target block.

13 Claims, 18 Drawing Sheets derive value of intra MIP flag for first target block when intra MIP mode is applied to first target block — S1510 set variable MIP flag for preset specific region that is same as region of first target block based on value of intra MIP flag — S1520 derive intra prediction mode for second target block based on variable MIP flag for first target block — S1530 derive prediction samples for second target block based on intra prediction mode for second target block — S1540 derive residual samples for second target block based on prediction samples — S1550 encode and output transform coefficient information generated based on intra MIP flag and residual samples — S1560

(51) Int. Cl.
*H04N 19/159* (2014.01)
*H04N 19/176* (2014.01)
*H04N 19/46* (2014.01)

(58) Field of Classification Search
USPC ..................................................... 375/240.02
See application file for complete search history.

(56) References Cited

U.S. PATENT DOCUMENTS

| | | | | |
|---|---|---|---|---|
| 2022/0116663 | A1* | 4/2022 | Ma | H04N 19/176 |
| 2022/0182669 | A1* | 6/2022 | Zhu | H04N 19/593 |
| 2022/0256141 | A1* | 8/2022 | Filippov | H04N 19/105 |
| 2022/0264124 | A1* | 8/2022 | Deng | H04N 19/124 |
| 2023/0117245 | A1* | 4/2023 | Shimizu | H04N 19/157<br>375/240.24 |
| 2024/0022732 | A1* | 1/2024 | Chen | H04N 19/132 |

* cited by examiner

RECONSTRUCTED IMAGE (PICTURE)
BITSTREAM
DECODING APPARATUS
300
ENTROPY DECODER
310
320
DEQUANTIZER
321
INVERSE TRANSFORMER
322
340
FILTER
350
MEMORY
DPB
360
330
INTRA PREDICTOR
331
INTER PREDICTOR
332

(a)

(b)

IMAGE CODING METHOD AND DEVICE THEREFOR

CROSS-REFERENCE TO RELATED APPLICATIONS

This application is a National Stage application under 35 U.S.C. § 371 of International Application No. PCT/KR2021/005837, filed on May 11, 2021, which claims the benefit of U.S. Provisional Application No. 63/023,229, filed on May 11, 2020. The disclosures of the prior applications are incorporated by reference in their entirety.

TECHNICAL FIELD

The present document relates to an image coding technique and, more particularly, to an image coding method based on intra prediction in an image coding system and a method therefor.

RELATED ART

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical aspect of the present disclosure is to provide a method and an apparatus for increasing image coding efficiency.

Another technical aspect of the present document is to provide an efficient intra prediction method and an apparatus therefor.

Still another technical aspect of the present document is to provide an image coding method for matrix-based intra prediction and an apparatus therefor.

Yet another technical aspect of the present document is to provide an image coding method for IPS-based intra prediction and an apparatus therefor.

According to an embodiment of the present document, there is provided an image decoding method performed by a decoding apparatus. The method may include: receiving image information comprising intra prediction type information from a bitstream, the intra prediction type information comprising an intra MIP syntax element for a first target block; deriving a value of the intra MIP syntax element; setting a variable MIP flag for a preset specific region that is the same as a region of the first target block based on the value of the intra MIP syntax element; deriving an intra prediction mode for a second target block; deriving a prediction sample for the second target block based on the intra prediction mode for the second target block; and generating a reconstructed block based on the prediction sample, wherein the intra prediction mode for the second target block may be derived based on the variable MIP flag for the first target block.

The first target block may be a left neighboring block of the second target block, the deriving of the intra prediction mode for the second target block may include: deriving a candidate intra prediction mode based on the variable MIP flag, and deriving the intra prediction mode for the second target block based on the candidate intra prediction mode, the specific region may include a sample position of (xCb−1, yCb+cbHeight−1), (xCb, yCb) may be a position of a top-left sample of the second target block, and cbHeight may indicate a height of the second target block.

The first target block may be a top neighboring block of the second target block, the deriving of the intra prediction mode for the second target block may include: deriving a candidate intra prediction mode based on the variable MIP flag; and deriving the intra prediction mode for the second target block based on the candidate intra prediction mode, the specific region may include a sample position of (xCb+cbWidth−1, yCb−1), (xCb, yCb) may be a position of a top-left sample of the second target block, and cb Width may indicate a width of the second target block.

The second target block may include a chroma block, the first target block may bea luma block related to the chroma block, and the deriving of the intra prediction mode for the second target block may include: deriving a corresponding luma intra prediction mode based on the variable MIP flag; and deriving the intra prediction mode for the second target block based on the corresponding luma intra prediction mode.

Here, the specific region may include a sample position of (xCb+cbWidth/2, yCb+cbHeight/2) based on a tree type of the second target block not being a single tree or a chroma array type thereof not being 3, (xCb, yCb) may indicate a top-left position of the chroma block in a luma sample unit, cbWidth may indicate a width of a corresponding luma block corresponding to the chroma block, and cbHeight may indicate a height of the corresponding luma block.

The variable MIP flag may be set for the specific region based on a tree type of the first target block not being a dual tree chroma.

According to another embodiment of the present document, there is provided an image encoding method performed by an encoding apparatus. The method may include: deriving a value of an intra MIP flag for a first target block when an intra MIP mode is applied to the first target block; setting a variable MIP flag for a preset specific region that is the same as a region of the first target block based on the value of the intra MIP flag; deriving an intra prediction mode for a second target block; deriving a prediction sample for the second target block based on the intra prediction mode for the second target block; deriving residual samples for the second target block based on the prediction sample; and encoding and outputting transform coefficient information generated based on the intra MIP flag and the residual samples, wherein the intra prediction mode for the second target block may be derived based on the variable MIP flag for the first target block.

According to still another embodiment of the present document, there may be provided a digital storage medium that stores image data including encoded image information and/or a bitstream generated according to an image encoding method performed by an encoding apparatus.

According to yet another embodiment of the present document, there may be provided a digital storage medium that stores image data including encoded image information and/or a bitstream to cause a decoding apparatus to perform the image decoding method.

According to the present document, it is possible to increase overall image/video compression efficiency.

According to the present document, it is possible to increase efficiency in intra prediction.

According to the present document, it is possible to increase image coding efficiency for matrix-based intra prediction.

According to the present document, it is possible to increase image coding efficiency for ISP-based intra prediction.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure and may include various effects that can be understood or derived from the technical features of the present disclosure.

DESCRIPTION OF EXEMPLARY EMBODIMENTS

Figure 1:
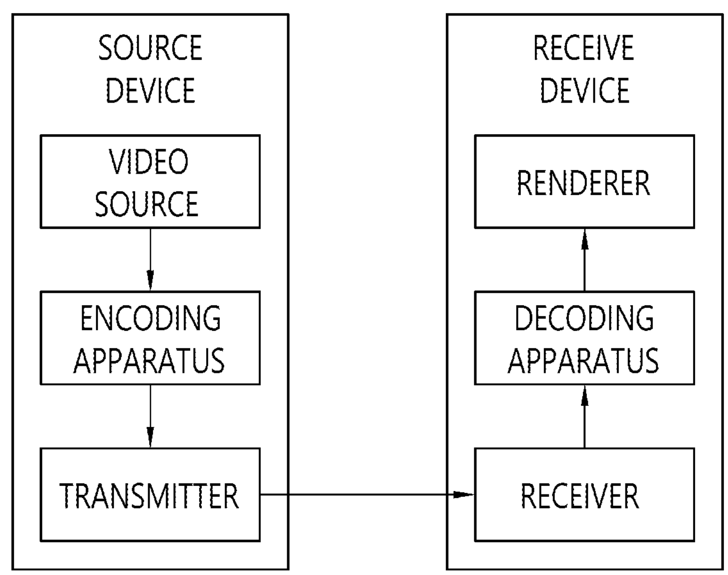
FIG. 1 schematically illustrates an example of a video/image coding system to which the present disclosure is applicable.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively."

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". That is, "prediction" in the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

Technical features individually described in one figure in the present disclosure may be individually implemented or may be simultaneously implemented.

FIG. 1 schematically illustrates an example of a video/image coding system to which the present disclosure is applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
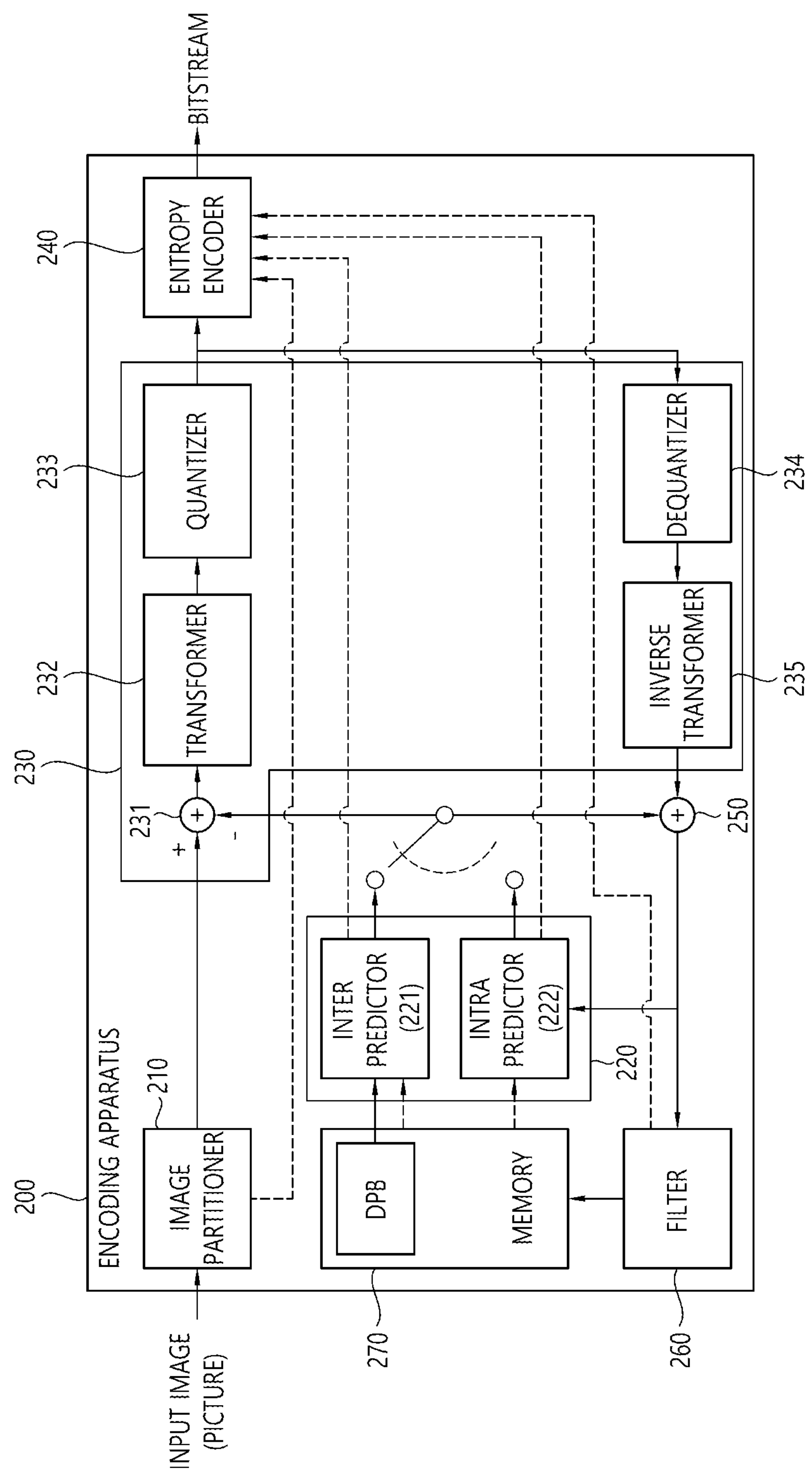
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The subtractor 231 subtracts a prediction signal (predicted block, prediction sample array) output from the inter predictor 221 or the intra predictor 222 from an input image signal (original block, original sample array) to generate a residual signal (residual block, residual sample array), and the generated residual signal is transmitted to the transformer 232. In this case, as shown, a unit which subtracts the prediction signal (predicted block, prediction sample array) from the input image signal (original block, original sample array) in the encoder 200 may be called the subtractor 231. The predictor may perform prediction on a processing target block (hereinafter, referred to as 'current block'), and may generate a predicted block including prediction samples for the current block. The predictor may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present disclosure, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
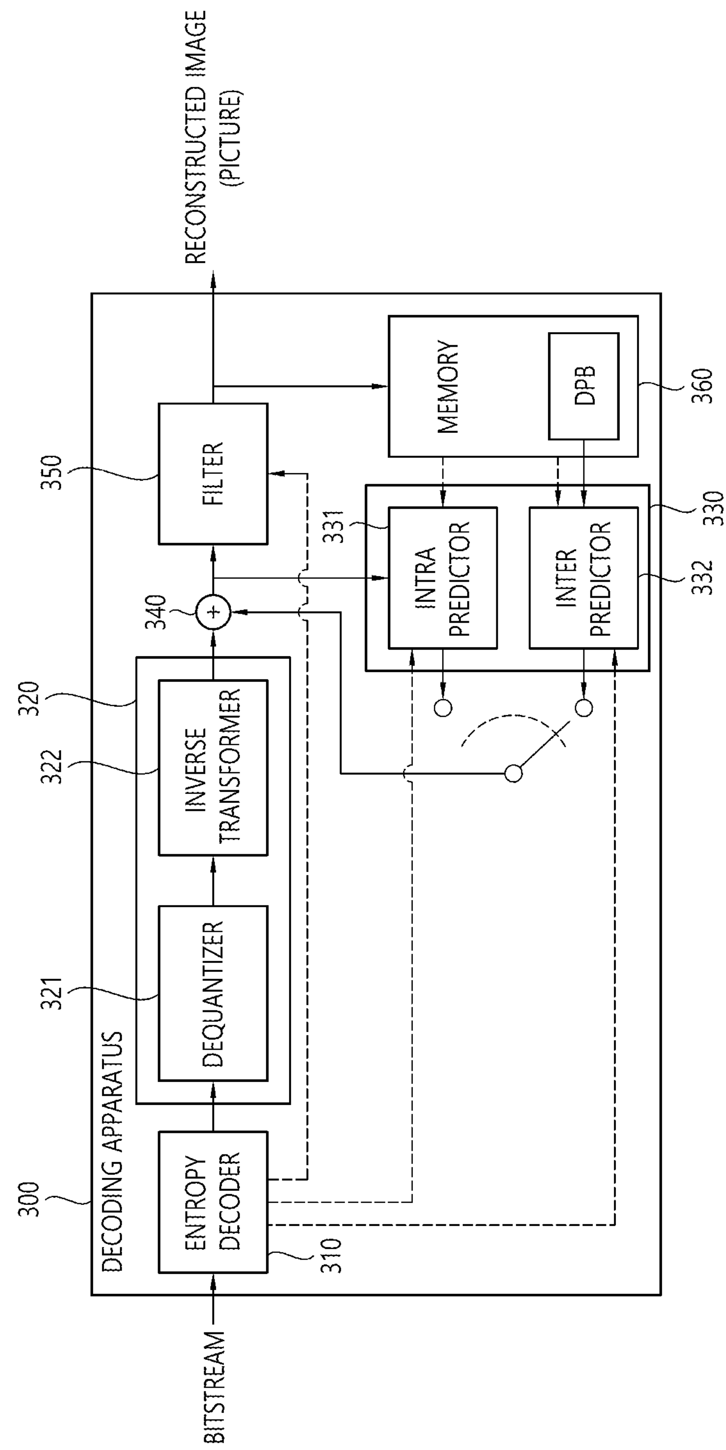
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The deqauntizer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). In addition, the predictor may perform intra block copy (IBC) for prediction on a block. The intra block copy may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In this specification, the examples described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Figure 4:
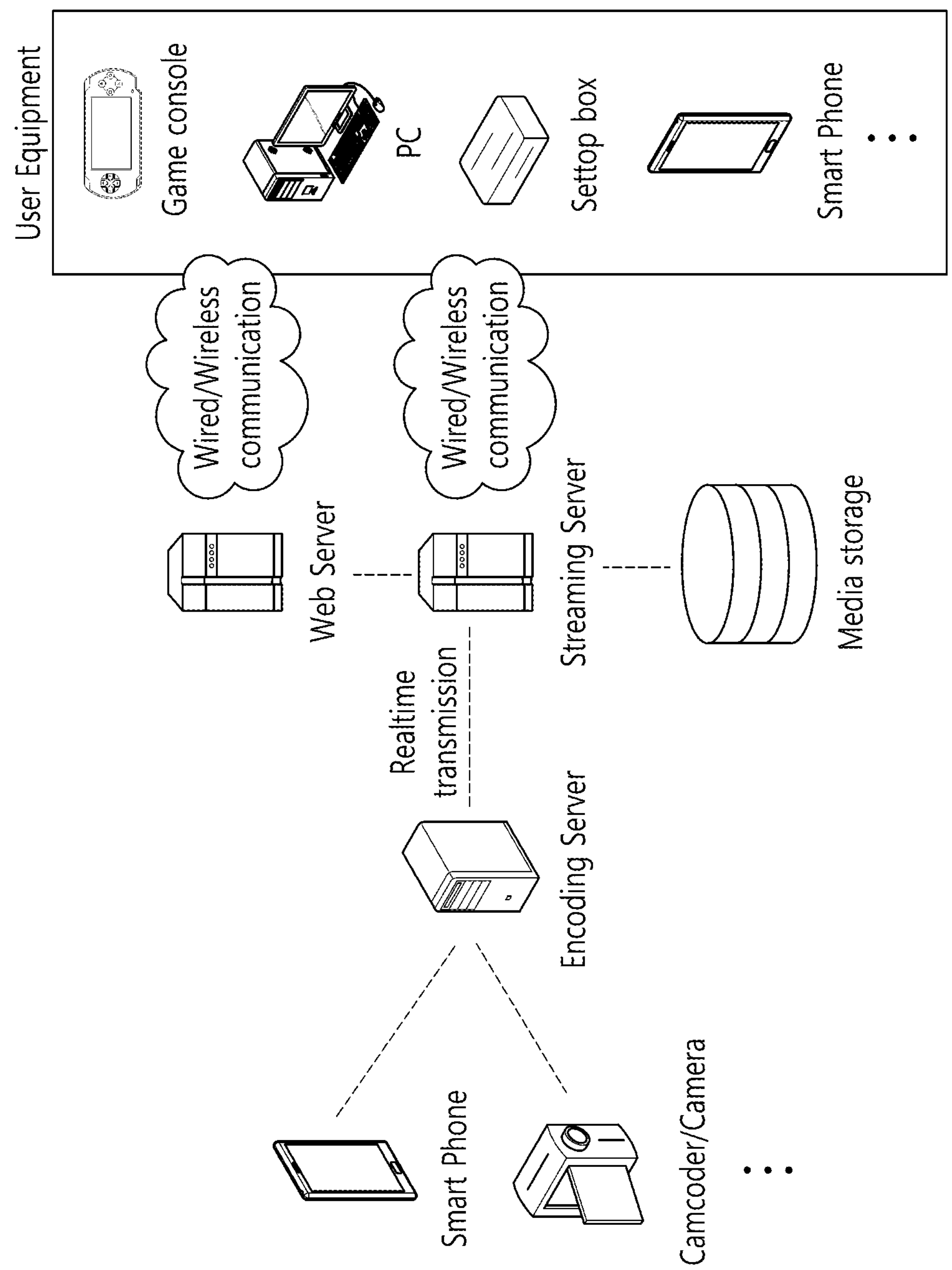
FIG. 4 illustrates the structure of a content streaming system to which the present disclosure is applied.

FIG. 4 illustrates the structure of a content streaming system to which the present disclosure is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

When intra prediction is performed, a correlation between samples may be used, and a difference between an original block and a prediction block, that is, a residual, may be obtained. The foregoing transformation and quantization may be applied to the residual., and accordingly spatial redundancy may be reduced. Hereinafter, an encoding method and a decoding method using an intra prediction are specifically described.

Intra prediction refers to prediction for generating prediction samples for a current block based on reference samples outside the current block within a picture (hereinafter, a current picture) including the current block. In this case, the reference samples outside the current block may refer to samples adjacent to the current block. When intra prediction is applied to the current block, neighboring reference samples to be used for the intra prediction of the current block may be derived.

For example, when the size (width×height) of the current block is nW×nH, neighboring reference samples of the current block may include a total of 2×nH samples including samples adjacent to the left boundary of the current block and a bottom-left neighboring sample, a total of 2×nW samples including samples adjacent to the top boundary of the current block and a top-right neighboring sample, and one top-left neighboring sample of the current block.

Alternatively, the neighboring reference samples of the current block may include a plurality of rows of top neighboring samples and a plurality of columns of left neighboring samples. Further, the neighboring reference samples of the current block may include a total of nH samples adjacent to the right boundary of the current block having a size of nW×nH, a total of nW samples adjacent to the bottom boundary of the current block, and one bottom-right neighboring sample of the current block.

Here, some of the neighboring reference samples of the current block may not yet be decoded or may be unavailable. In this case, a decoding apparatus may configure neighboring reference samples to be used for the prediction by substituting unavailable samples with available samples. Alternatively, the decoding apparatus may configure neighboring reference samples to be used for the prediction through interpolation of available samples.

When the neighboring reference samples are derived, (i) a prediction sample may be derived based on averaging or interpolation of the neighboring reference samples of the current block, or (ii) a prediction sample may be derived based on a reference sample present in a specific (prediction) direction for the prediction sample among the neighboring reference samples of the current block. (i) may be applied when an intra prediction mode is a non-directional mode or a non-angular mode, and (ii) may be applied when the intra prediction mode is a directional mode or an angular mode.

The intra prediction mode may include non-directional (or non-angular) intra prediction modes and directional (or angular) intra prediction modes. For example, in HEVC, Intra prediction modes including two non-directional intra prediction modes and 33 directional intra prediction modes are used. The non-directional intra prediction modes may include a planar intra prediction mode, which is intra prediction mode 0, and a DC intra prediction mode, which is intra prediction mode 1, and the directional intra prediction modes may include intra prediction modes 2 to 34. The planar intra prediction mode may be referred to as a planner mode, and the DC intra prediction mode may be referred to as a DC mode.

Alternatively, in order to capture an arbitrary edge direction presented in a natural video, the number of directional intra prediction modes may be extended from 33 to 65 as shown below in FIG. 10. In this case, the intra prediction modes may include two non-directional intra prediction modes and 65 directional intra prediction modes. The non-directional intra prediction modes may include a planar intra prediction mode, which is intra prediction mode 0, and a DC intra prediction mode, which is intra prediction mode 1, and the directional intra prediction modes may include intra prediction modes 2 to 66. The extended directional intra prediction modes may be applied to blocks of any size, and may be applied to both a luma component and a chroma component. However, the foregoing example is for illustration, and embodiments of the present document may also be applied in a case where the number of intra prediction modes is different. Intra prediction mode 67 may be further used depending on cases, and intra prediction mode 67 may refer to a linear model (LM) mode.

Figure 5:
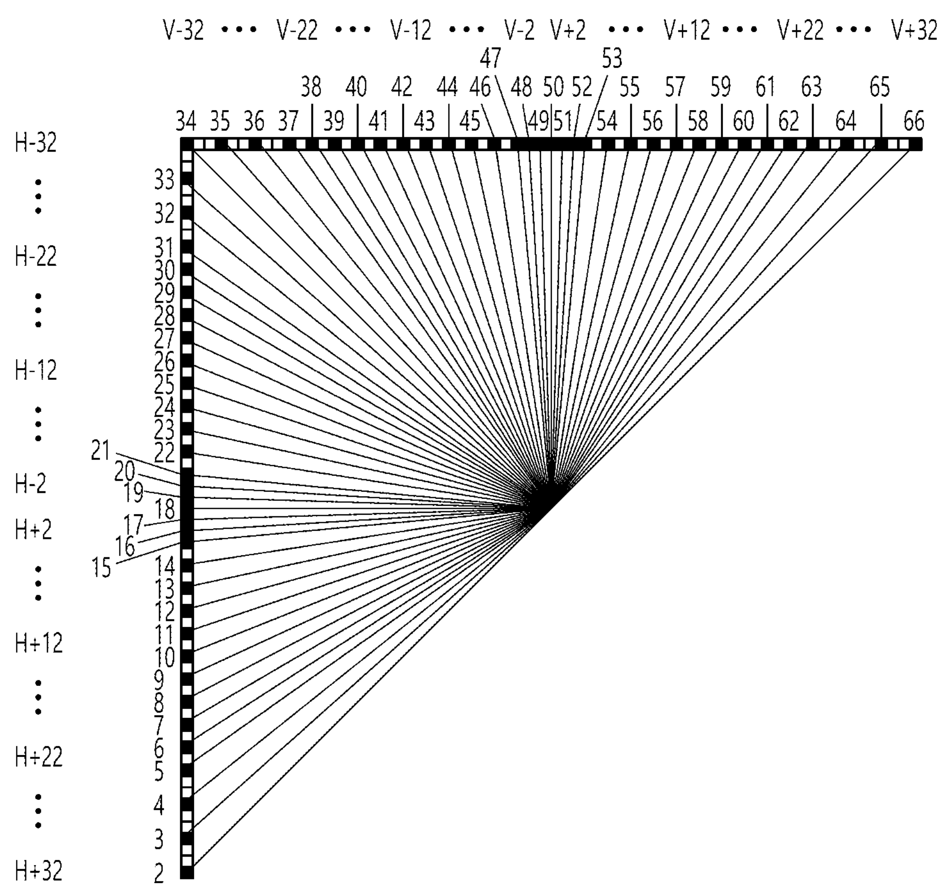
FIG. 5 illustrates intra directional modes in 65 prediction directions.

FIG. 5 illustrates an example of intra prediction modes to which embodiments of the present document are applicable.

Referring to FIG. 5, intra prediction modes may be divided into intra prediction modes having horizontal directionality and intra prediction modes having vertical directionality based on intra prediction mode 34 having a top-left diagonal prediction direction. In FIG. 5, H and V indicate horizontal directionality and vertical directionality, respectively, and each of numbers −32 to 32 indicates displacement in a 1/32 unit on a sample grid position. Intra prediction modes 2 to 33 have horizontal directionality, and intra prediction modes 34 to 66 have vertical directionality. Intra prediction mode 18 and intra prediction mode 50 refer to a horizontal intra prediction mode and a vertical intra prediction mode, respectively. Intra prediction mode 2 may be referred to as a bottom-left diagonal intra prediction mode, intra prediction mode 34 may be referred to as a top-left diagonal intra prediction mode, and intra prediction mode 66 may be referred to as a top-right diagonal intra prediction mode.

Matrix-based intra prediction (hereinafter, MIP) may be used as a method for intra prediction. The MIP may be referred to as affine linear weighted intra prediction (ALWIP) or matrix weighted intra prediction (MWIP).

When the MIP is applied to the current block, prediction samples for the current block may be derived by ii) performing a matrix-vector multiplication process i) using neighboring reference samples that have been subjected to an averaging process and (iii) further performing a horizontal/vertical interpolation process if necessary. Intra prediction modes used for the MIP may be differently configured from intra prediction modes used in the aforementioned LIP, PDPC, MRL, or ISP intra prediction or used in the normal intra prediction.

An intra prediction mode for the MIP may be referred to as an affine linear weighted intra prediction mode or a matrix-based intra prediction mode. For example, a matrix and an offset used in matrix-vector multiplication may be differently configured depending on the intra prediction mode for the MIP. Here, the matrix may be referred to as a (affine) weighted matrix, and the offset may be referred to as an (affine) offset vector or a (affine) bias vector. In the present disclosure, the intra prediction mode for the MIP may be referred to as an MIP intra prediction mode, an affine linear weighted intra prediction (ALWIP) mode, a matrix-weighted intra prediction (MWI) mode, or a matrix-based intra prediction mode.

To predict a sample of a rectangular block having a width (W) and a height (H), the MIP uses one H line among reconstructed samples neighboring the left boundary of the block and one W line among reconstructed samples neighboring the top boundary of the block as input values. When no reconstructed sample is available, reference samples may be generated by an interpolation method applied to general intra prediction.

Figure 6:
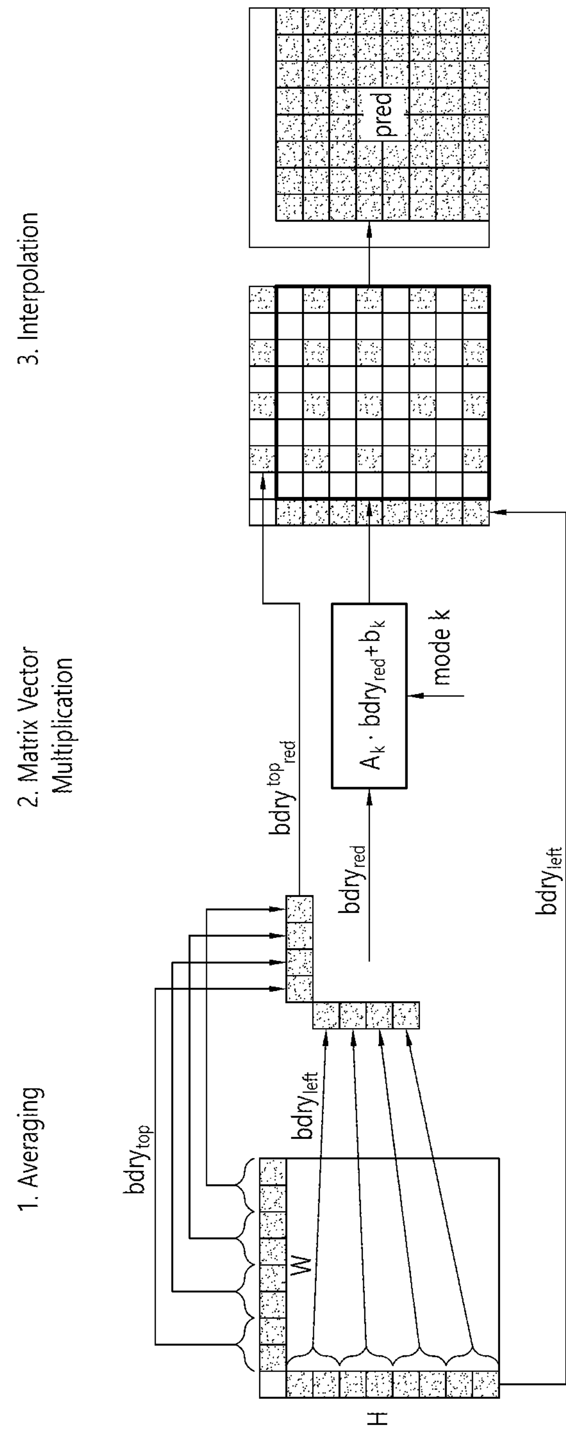
FIG. 6 illustrates an MIP-based prediction sample generation process according to an example.

FIG. 6 illustrates an MIP-based prediction sample generation process according to an example. The MIP process is described as follows with reference to FIG. 6.

1. Averaging Process

Among boundary samples, four samples for a case of W=H=4 and eight samples for any other case are extracted by an averaging process.

2. Matrix-Vector Multiplication Process

Matrix vector multiplication is performed with the averaged samples as inputs, followed by adding an offset. Through this operation, reduced prediction samples for a subsampled sample set in an original block may be derived.

3. (Linear) Interpolation Process

Prediction samples at the remaining positions are generated from the prediction samples of the subsampled sample set by linear interpolation, which is single-step linear interpolation in each direction.

A matrix and an offset vector necessary to generate a prediction block or a prediction sample may be selected from three sets $S_0$, $S_1$, and $S_2$ for a matrix.

Set $S_0$ may include 16 matrices $A_0^i$, $i \in \{0, \ldots, 15\}$, and each matrix may include 16 rows, four columns, and 16 offset vectors $b_0^i$, $i \in \{0, \ldots, 15\}$. The matrices and the offset vectors of set $S_0$ may be used for a 4×4 block. In another example, set $S_0$ may include 18 matrices.

Set $S_1$ may include eight matrices $A_1^i$, $i \in \{0, \ldots, 7\}$, and each matrix may include 16 rows, eight columns, and eight offset vectors $b_1^i$, $i \in \{0, \ldots, 7\}$. In another example, set $S_1$ may include six matrices. The matrices and the offset vectors of set $S_1$ may be used for 4×8, 8×4, and 8×8 blocks. Alternatively, the matrices and the offset vectors of set $S_1$ may be used for a 4×H or W×4 block.

Finally, set $S_2$ may include six matrices $A_2^i$, $i \in \{0, \ldots, 5\}$, and each matrix may include 64 rows, eight columns, and six offset vectors $b_2^i$, $i \in \{0, \ldots, 5\}$. The matrices and the offset vectors of set $S_2$ or some thereof may be used for any block having a different size to which set $S_0$ and set $S_1$ are not applied. For example, the matrices and the offset vectors of set $S_2$ may be used for an operation of a block having a weight and width of 8 or greater.

The total number of multiplications required the calculation of matrix-vector product is always less than or equal to 4×W×H. That is, in an MIP mode, up to four multiplications per sample is required.

Further, a current block may be split into vertical or horizontal sub-partitions, and intra prediction may be performed based on the same intra prediction mode, in which neighboring reference samples may be derived and used by a unit of a sub-partition. That is, in this case, the intra prediction mode for the current block may be equally applied to the sub-partitions, and the neighboring reference samples may be derived and used by a unit of a sub-partition, thereby improving performance of the intra prediction in some cases. This prediction method may be referred to as intra sub-partitions (ISP) or ISP-based intra prediction.

Intra sub-partitions (ISP) coding refers to performing intra prediction coding by splitting a block to be currently coded in a horizontal direction or a vertical direction. In this case, a reconstructed block may be generated by performing encoding/decoding by a unit of a split block, and the reconstructed block may be used as a reference block for a next split block. According to an example, in ISP coding, one coding block may be split into two or four subblocks and may then be coded, and in ISP, one subblock is subjected to intra prediction with reference to the value of a reconstructed pixel of a left neighboring subblock or a top neighboring subblock. As used herein, "coding" may be used as a concept including both coding performed by an encoding apparatus and decoding performed by a decoding apparatus.

Table 1 shows the number of subblocks split according to the size of a block when ISP is applied, and sub-partitions split according to the ISP may be referred to as transform blocks (TUs).

TABLE 1

| Block size (CU) | Number of partitions |
|---|---|
| 4 × 4 | not available |
| 4 × 8, 8 × 4 | 2 |
| Any other case | 4 |

ISP splits a block predicted by luma intra into two or four sub-partitions in a vertical direction or a horizontal direction according to the size of the block. For example, a minimum size of a block to which ISP is applicable is 4×8 or 8×4. When the size of a block is greater than 4×8 or 8×4, the block is split into four sub-partitions.

Figure 7:
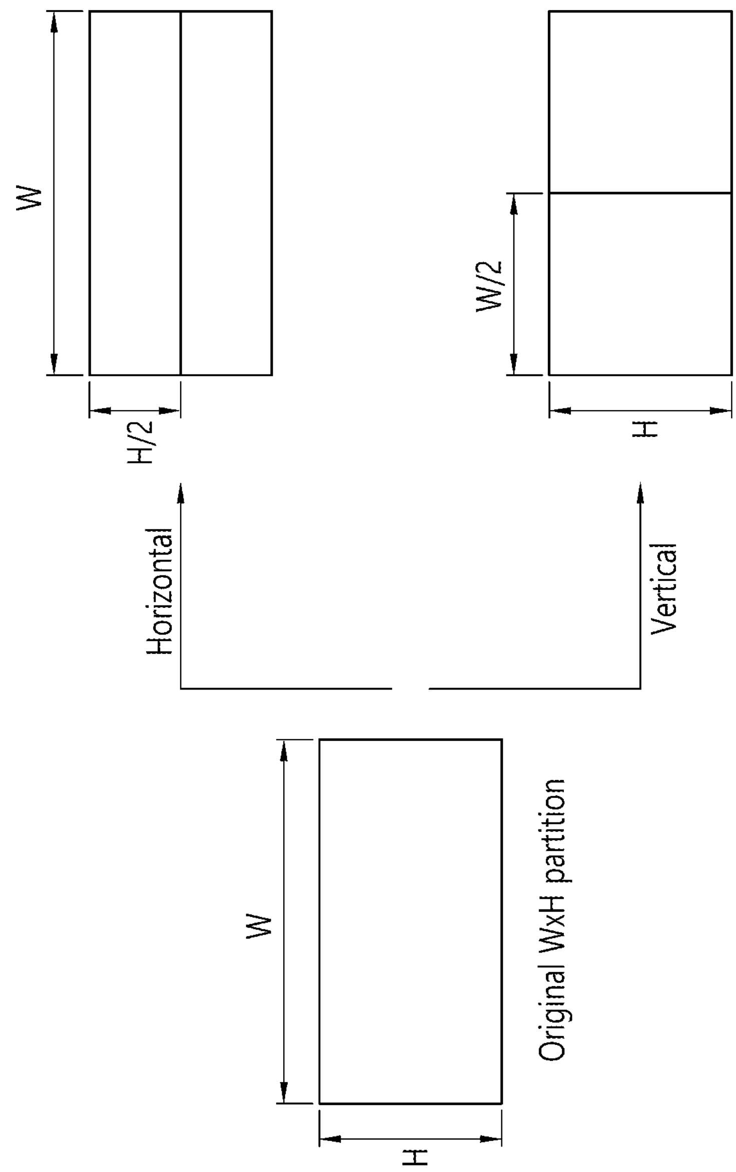
FIG. 7 illustrates an example of subblocks into which one coding block is split.
Figure 8:
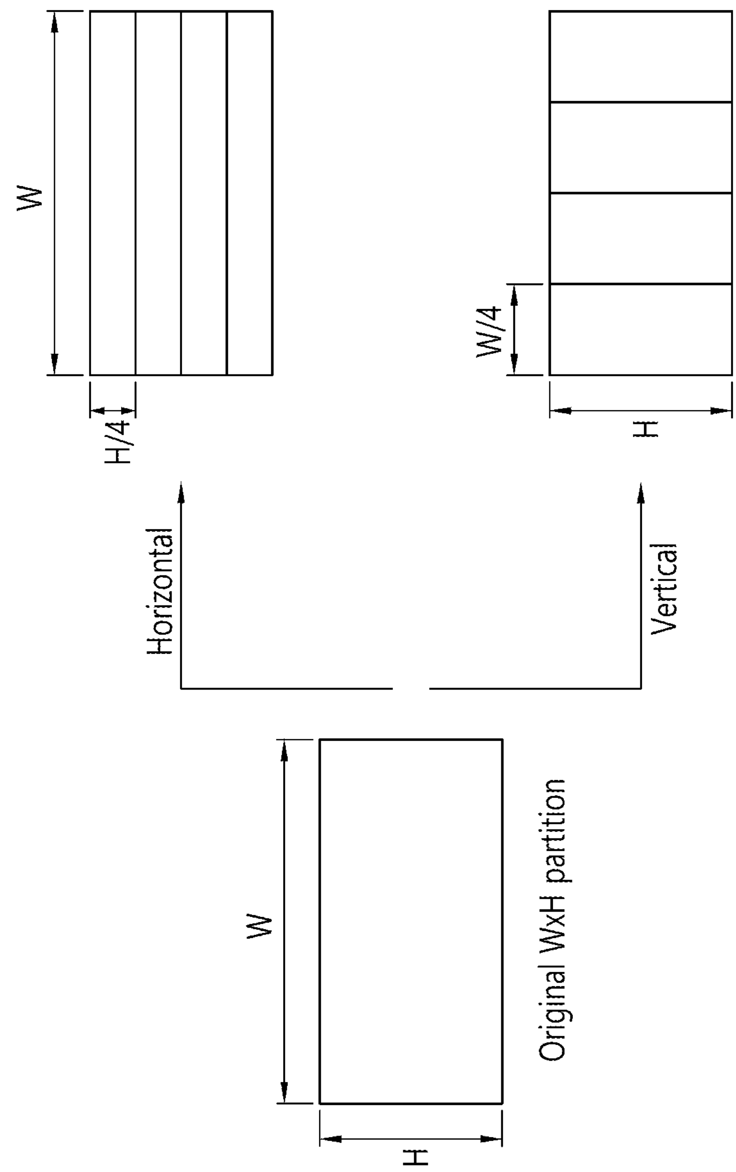
FIG. 8 illustrates another example of subblocks into which one coding block is split.

FIG. 7 and FIG. 8 illustrate examples in which one coding block is split into subblocks. Specifically, FIG. 7 illustrates an example of splitting a coding block (width (W)×height (H)) that is a 4×8 block or 8×4 block, and FIG. 8 illustrates an example of splitting a coding block that is not a 4×8 block, an 8×4 block, or a 4×4 block.

When ISP is applied, subblocks may be sequentially coded, for example, horizontally, vertically, left to right, or top to bottom, according to a split type, in which one subblock may be subjected to inverse transform, intra prediction, and reconstruction, after which a next subblock may be coded. For the leftmost or topmost subblock, a reconstructed pixel of a coding block already coded is used for reference as in a conventional intra prediction method. Further, when each side of a subsequent inner subblock is not adjacent to a previous subblock, a reconstructed pixel of an adjacent coding block already coded is used for reference to derive reference pixels adjacent to the side as in the conventional intra prediction method.

In an ISP coding mode, all subblocks may be coded with the same intra prediction mode, and a flag indicating whether to use ISP coding and a flag indicating a direction (horizontal or vertical) in which splitting is performed may be signaled. As shown in FIG. 7 and FIG. 8, the number of subblocks may be adjusted to 2 or 4 depending on a block shape, and when the size (width×height) of one subblock is less than 16, splitting into the corresponding number of subblocks may not be allowed or a restriction of not applying ISP coding may be set.

In an ISP prediction mode, one coding unit is split into two or four partition blocks, that is, subblocks, to be predicted, and the same intra prediction mode is applied to the two or four split blocks.

Figure 9:
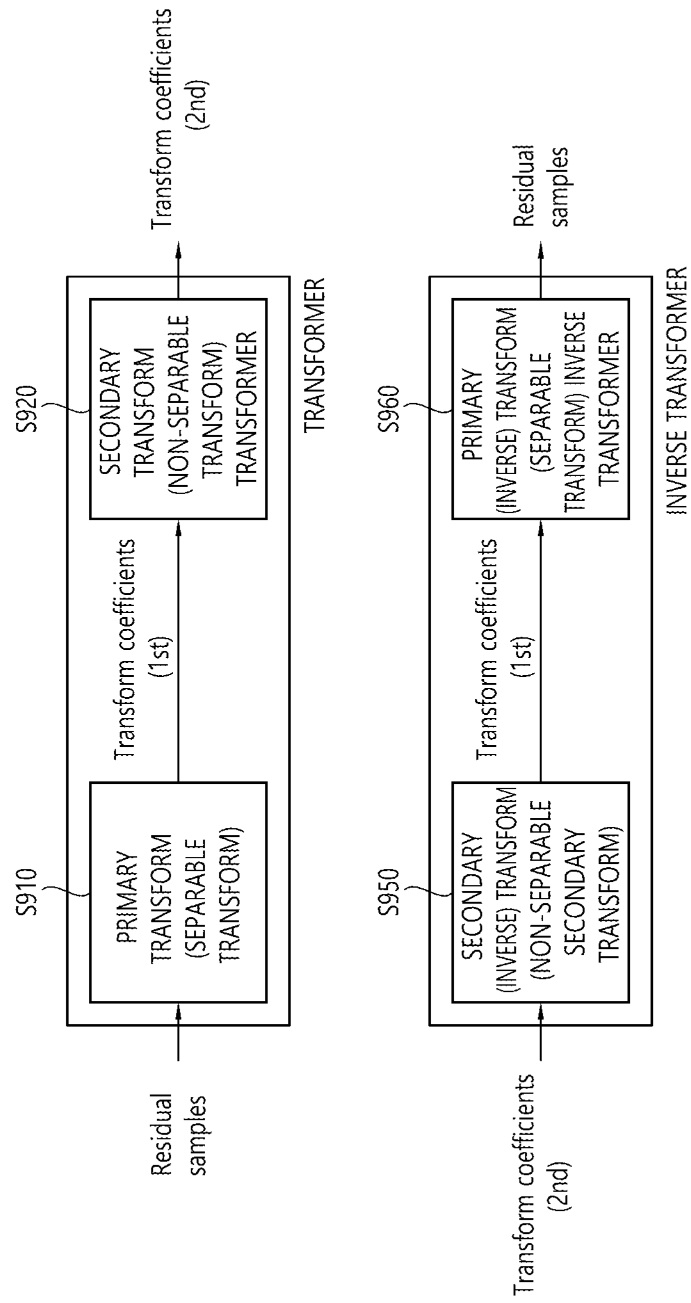
FIG. 9 schematically illustrates a multiple transform scheme according to an embodiment of the present document.

FIG. 9 schematically illustrates a multiple transform technique according to an embodiment of the present disclosure.

Referring to FIG. 9, a transformer may correspond to the transformer in the foregoing encoding apparatus of FIG. 2, and an inverse transformer may correspond to the inverse transformer in the foregoing encoding apparatus of FIG. 2, or to the inverse transformer in the decoding apparatus of FIG. 3.

The transformer may derive (primary) transform coefficients by performing a primary transform based on residual samples (residual sample array) in a residual block (S910). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the primary transform coefficients may be called temporary transform coefficients from the viewpoint of the transformer.

That is, when the conventional transform method is applied, transform coefficients may be generated by applying transform from a space domain to a frequency domain to a residual signal (or residual block) based on DCT type 2. However, when the multiple core transform is applied, transform coefficients (or primary transform coefficients) may be generated by applying transform from a space domain to a frequency domain to a residual signal (or residual block) based on DCT type 2, DST type 7, DCT type 8, and/or DST type 1. Here, DCT type 2, DST type 7, DCT type 8, and DST type 1 may be referred to as transform types, transform kernels, or transform cores. These DCT/DST types may be defined based on basis functions.

If the multiple core transform is performed, then a vertical transform kernel and a horizontal transform kernel for a target block may be selected from among the transform kernels, a vertical transform for the target block may be performed based on the vertical transform kernel, and a horizontal transform for the target block may be performed based on the horizontal transform kernel. Here, the horizontal transform may represent a transform for horizontal components of the target block, and the vertical transform may represent a transform for vertical components of the target block. The vertical transform kernel/horizontal transform kernel may be adaptively determined based on a prediction mode and/or a transform index of a target block (CU or sub-block) including a residual block.

Further, according to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trTypeVer value of 0 may be set to DCT2, a trTypeHor or trTypeVer value of 1 may be set to DST-7, and a trTypeHor or trTypeVer value of 2 may be set to DCT-8.

In this case, MTS index information may be encoded and signaled to the decoding apparatus to indicate any one of a plurality of transform kernel sets. For example, an MTS index of 0 may indicate that both trTypeHor and trType Ver values are 0, an MTS index of 1 may indicate that both trTypeHor and trType Ver values are 1, an MTS index of 2 may indicate that the trTypeHor value is 2 and the trType Ver value. Is 1, an MTS index of 3 may indicate that the trTypeHor value is 1 and the trTypeVer value is 2, and an MTS index of 4 may indicate that both both trTypeHor and trType Ver values are 2.

In one example, transform kernel sets according to MTS index information are illustrated in the following table.

TABLE 2

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may derive modified (secondary) transform coefficients by performing the secondary transform based on the (primary) transform coefficients (S920). The primary transform is a transform from a spatial domain to a frequency domain, and the secondary transform refers to transforming into a more compressive expression by using a correlation existing between (primary) transform coefficients. The secondary transform may include a non-separable transform. In this case, the secondary transform may be called a non-separable secondary transform (NSST), or a mode-dependent non-separable secondary transform (MDNSST). The non-separable secondary transform may represent a transform which generates modified transform coefficients (or secondary transform coefficients) for a residual signal by secondary-transforming, based on a non-separable transform matrix, (primary) transform coefficients derived through the primary transform. At this time, the vertical transform and the horizontal transform may not be applied separately (or horizontal and vertical transforms may not be applied independently) to the (primary) transform coefficients, but the transforms may be applied at once based on the non-separable transform matrix. In other words, the non-separable secondary transform may represent a transform method in which is not separately applied in the vertical direction and the horizontal direction for the (primary) transform coefficients, and for example, two-dimensional signals (transform coefficients) are re-arranged to a one-dimensional signal through a certain determined direction (e.g., row-first direction or column-first direction), and then modified transform coefficients (or secondary transform coefficients) are generated based on the non-separable transform matrix. For example, according to a row-first order, M×N blocks are disposed in a line in an order of a first row, a second row, . . . , and an Nth row. According to a column-first order, M×N blocks are disposed in a line in an order of a first column, a second column, . . . , and an Nth column. The non-separable secondary transform may be applied to a top-left region of a block configured with (primary) transform coefficients (hereinafter, may be referred to as a transform coefficient block). For example, if the width (W) and the height (H) of the transform coefficient block are all equal to or greater than 8, an 8×8 non-separable secondary transform may be applied to a top-left 8×8 region of the transform coefficient block. Further, if the width (W) and the height (H) of the transform coefficient block are all equal to or greater than 4, and the width (W) or the height (H) of the transform coefficient block is less than 8, then a 4×4 non-separable secondary transform may be applied to a top-left min (8,W)×min (8,H) region of the transform coefficient block. However, the embodiment is not limited to this, and for example, even if only the condition that the width (W) or height (H) of the transform coefficient block is equal to or greater than 4 is satisfied, the 4×4 non-separable secondary transform may be applied to the top-left min (8,W)×min (8,H) region of the transform coefficient block.

Here, to select a transform kernel, two non-separable secondary transform kernels per transform set for a non-separable secondary transform may be configured for both the 8×8 transform and the 4×4 transform, and there may be four transform sets. That is, four transform sets may be configured for the 8×8 transform, and four transform sets may be configured for the 4×4 transform. In this case, each of the four transform sets for the 8×8 transform may include two 8×8 transform kernels, and each of the four transform sets for the 4×4 transform may include two 4×4 transform kernels.

However, as the size of the transform, that is, the size of a region to which the transform is applied, may be, for example, a size other than 8×8 or 4×4, the number of sets may be n, and the number of transform kernels in each set may be k.

The transform set may be referred to as an NSST set or an LFNST set. A specific set among the transform sets may be selected, for example, based on the intra prediction mode of the current block (CU or subblock). A low-frequency non-separable transform (LFNST) may be an example of a reduced non-separable transform, which will be described later, and represents a non-separable transform for a low frequency component.

According to an example, the four transform sets according to the intra prediction mode may be mapped, for example, as shown in the following table.

TABLE 3

| predModeIntra | lnfstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

As shown in Table 3, any one of the four transform sets, that is, lfnstTrSetIdx, may be mapped to any one of four indexes, that is, 0 to 3, according to the intra prediction mode.

When it is determined that a specific set is used for the non-separable transform, one of k transform kernels in the specific set may be selected through a non-separable secondary transform index. An encoding apparatus may derive a non-separable secondary transform index indicating a specific transform kernel based on a rate-distortion (RD) check and may signal the non-separable secondary transform index to a decoding apparatus. The decoding apparatus may select one of the k transform kernels in the specific set based on the non-separable secondary transform index. For example, lfnst index value 0 may refer to a first non-separable secondary transform kernel, lfnst index value 1 may refer to a second non-separable secondary transform kernel, and lfnst index value 2 may refer to a third non-separable secondary transform kernel. Alternatively, lfnst index value 0 may indicate that the first non-separable secondary transform is not applied to the target block, and lfnst index values 1 to 3 may indicate the three transform kernels.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S950), and may obtain a residual block (residual samples) by performing a primary (inverse) transform on the (primary) transform coefficients (S960). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The decoding apparatus may further include a secondary inverse transform application determinator (or an element to determine whether to apply a secondary inverse transform) and a secondary inverse transform determinator (or an element to determine a secondary inverse transform). The secondary inverse transform application determinator may determine whether to apply a secondary inverse transform. For example, the secondary inverse transform may be an NSST, an RST, or an LFNST and the secondary inverse transform application determinator may determine whether to apply the secondary inverse transform based on a secondary transform flag obtained by parsing the bitstream. In another example, the secondary inverse transform application determinator may determine whether to apply the secondary inverse transform based on a transform coefficient of a residual block.

The secondary inverse transform determinator may determine a secondary inverse transform. In this case, the secondary inverse transform determinator may determine the secondary inverse transform applied to the current block based on an LFNST (NSST or RST) transform set specified according to an intra prediction mode. In an embodiment, a secondary transform determination method may be determined depending on a primary transform determination method. Various combinations of primary transforms and secondary transforms may be determined according to the intra prediction mode. Further, in an example, the secondary inverse transform determinator may determine a region to which a secondary inverse transform is applied based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

In the present document, reduced secondary transform (RST) in which the size of a transform matrix (kernel) is reduced may be applied in the concept of NSST in order to reduce the amount of computation and memory required for the non-separable secondary transform. RST is generally performed in a low-frequency region including a non-zero coefficient in a transform block, and may thus be referred to as low-frequency non-separable transform (LFNST). The transform index may be referred to as an LFNST index.

In the present specification, LFNST may refer to a transform which is performed on residual samples for a target block based on a transform matrix having a reduced size. In the case of performing the reduced transform, the amount of computation required for transform may be reduced due to a reduction in the size of the transform matrix. That is, the LFNST may be used to address the computational complexity issue occurring at the non-separable transform or the transform of a block of a great size.

When the secondary inverse transform is performed based on LFNST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the target block based on the inverse primary transform of the modified transform coefficients. The inverse primary transform refers to the inverse transform of the primary transform applied to the residual. In the present document, deriving a transform coefficient based on a transform may refer to deriving a transform coefficient by applying the transform.

Figure 10:
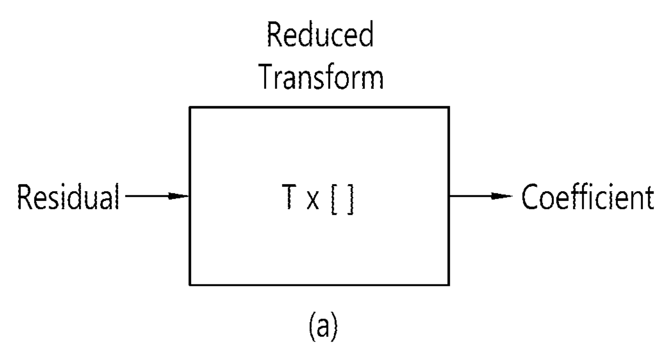
FIG. 10 illustrates an RST according to an embodiment of the present document.
Figure 10:
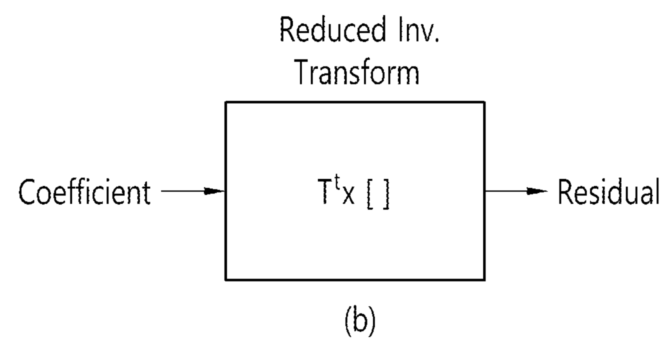

FIG. 10 is a diagram illustrating an RST according to an embodiment of the present disclosure.

In the present disclosure, a "target block" may refer to a current block to be coded, a residual block, or a transform block.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, simplified factor, simple factor or other various terms. Meanwhile, R may be referred to as a reduced coefficient, but according to circumstances, the reduced factor may mean R. Further, according to circumstances, the reduced factor may mean the N/R value.

In an example, the reduced factor or the reduced coefficient may be signaled through a bitstream, but the example is not limited to this. For example, a predefined value for the reduced factor or the reduced coefficient may be stored in each of the encoding apparatus 200 and the decoding apparatus 300, and in this case, the reduced factor or the reduced coefficient may not be signaled separately.

The size of the reduced transform matrix according to an example may be R×N less than N×N, the size of a conventional transform matrix, and may be defined as in Equation 1 below.

$$T_{R\times N} = \begin{bmatrix} t_{11} & t_{12} & t_{13} & \cdots & t_{1N} \\ t_{21} & t_{22} & t_{23} & & t_{2N} \\ & \vdots & & \ddots & \vdots \\ t_{R1} & t_{R2} & t_{R3} & \cdots & t_{RN} \end{bmatrix} \quad \text{[Equation 1]}$$

The matrix T in the Reduced Transform block shown in FIG. 10(*a*) may mean the matrix $T_{R\times N}$ of Equation 1. As shown in FIG. 10(*a*), when the reduced transform matrix $T_{R\times N}$ is multiplied to residual samples for the target block, transform coefficients for the target block may be derived.

In an example, if the size of the block to which the transform is applied is 8×8 and R=16 (i.e., R/N=16/64=¼), then the RST according to FIG. 10(*a*) may be expressed as a matrix operation as shown in Equation 2 below. In this case, memory and multiplication calculation can be reduced to approximately ¼ by the reduced factor.

In the present disclosure, a matrix operation may be understood as an operation of multiplying a column vector by a matrix, disposed on the left of the column vector, to obtain a column vector.

$$\begin{bmatrix} t_{1,1} & t_{1,2} & t_{1,3} & \cdots & t_{1,64} \\ t_{2,1} & t_{2,2} & t_{2,3} & & t_{2,64} \\ & \vdots & & \ddots & \vdots \\ t_{16,1} & t_{16,2} & t_{16,3} & \cdots & t_{16,64} \end{bmatrix} \times \begin{bmatrix} r_1 \\ r_2 \\ \vdots \\ r_{64} \end{bmatrix} \quad \text{[Equation 2]}$$

In Equation 2, $r_1$ to $r_{64}$ may represent residual samples for the target block and may be specifically transform coefficients generated by applying a primary transform. As a result of the calculation of Equation 2 transform coefficients ci for the target block may be derived, and a process of deriving ci may be as in Equation 3.

[Equation 3]

```
for i from to R:
    c_i = 0
    for j from 1 to N
        c_i += t_ij * r_j
```

As a result of the calculation of Equation 3, transform coefficients $c_1$ to $c_R$ for the target block may be derived. That is, when R=16, transform coefficients $c_1$ to $c_{16}$ for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the LFNST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the target block by performing the primary transform and the RST-based secondary transform on residual samples for the target block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the target block based on the inverse primary transform for the modified transform coefficients.

The size of the inverse RST matrix $T_{N\times R}$ according to an example is N×R less than the size N×N of the regular inverse transform matrix, and is in a transpose relationship with the reduced transform matrix TR×N shown in Equation 4.

The matrix $T^t$ in the Reduced Inv. Transform block shown in FIG. 10(*b*) may mean the inverse RST matrix $T_{R\times N}{}^T$ (the superscript T means transpose). When the inverse RST matrix TRENT is multiplied to the transform coefficients for the target block as shown in FIG. 10(*b*), the modified transform coefficients for the target block or the residual samples for the current block may be derived. The inverse RST matrix $T_{R\times N}{}^T$ may be expressed as $(T^{R\times NT})_{N\times R}$.

More specifically, when the inverse RST is applied as the secondary inverse transform, the modified transform coefficients for the target block may be derived when the inverse RST matrix $T_{R\times N}{}^T$ is multiplied to the transform coefficients for the target block. Meanwhile, the inverse RST may be applied as the inverse primary transform, and in this case, the residual samples for the target block may be derived when the inverse RST matrix $T_{R\times N}{}^T$ is multiplied to the transform coefficients for the target block.

In an example, if the size of the block to which the inverse transform is applied is 8×8 and R=16 (i.e., R/N=16/64=¼), then the RST according to FIG. 10(*b*) may be expressed as a matrix operation as shown in Equation 4 below.

$$\begin{bmatrix} t_{1,1} & t_{2,1} & & t_{16,1} \\ t_{1,2} & t_{2,2} & \cdots & t_{16,2} \\ t_{1,3} & t_{2,3} & & t_{16,3} \\ \vdots & \vdots & & \vdots \\ & \vdots & \ddots & \vdots \\ t_{1,64} & t_{2,64} & \cdots & t_{16,64} \end{bmatrix} \times \begin{bmatrix} c_1 \\ c_2 \\ \vdots \\ c_{16} \end{bmatrix} \quad \text{[Equation 4]}$$

In Equation 4, $c_1$ to $c_{16}$ may represent the transform coefficients for the target block. As a result of the calculation of Equation 4, $r_i$ representing the modified transform coefficients for the target block or the residual samples for the target block may be derived, and the process of deriving $r_i$ may be as in Equation 5.

[Equation 5]

```
For i from 1 to N
  r_i = 0
  for j from 1 to R
    r_i += t_ij * c_j
```

As a result of the calculation of Equation 5, $r_1$ to $r_N$ representing the modified transform coefficients for the target block or the residual samples for the target block may be derived. When considered from the viewpoint of the size of the inverse transform matrix, the size of the regular inverse transform matrix is 64×64 (N×N), but the size of the reduced inverse transform matrix is reduced to 64×16 (R×N), so memory usage in a case of performing the inverse RST can be reduced by an R/N ratio when compared with a case of performing the regular inverse transform. In addition, when compared to the number of multiplication calculations N×N in a case of using the regular inverse transform matrix, the use of the reduced inverse transform matrix can reduce the number of multiplication calculations by the R/N ratio (N×R).

According to an embodiment of the present disclosure, for a transform in an encoding process, only 48 pieces of data may be selected and a maximum 16×48 transform kernel matrix may be applied thereto, rather than applying a 16×64 transform kernel matrix to 64 pieces of data forming an 8×8 region. Here, "maximum" means that m has a maximum value of 16 in an m×48 transform kernel matrix for generating m coefficients. That is, when an RST is performed by applying an m×48 transform kernel matrix (m≤16) to an 8×8 region, 48 pieces of data are input and m coefficients are generated. When m is 16, 48 pieces of data are input and 16 coefficients are generated. That is, assuming that 48 pieces of data form a 48×1 vector, a 16×48 matrix and a 48×1 vector are sequentially multiplied, thereby generating a 16×1 vector. Here, the 48 pieces of data forming the 8×8 region may be properly arranged, thereby forming the 48×1 vector. For example, a 48×1 vector may be constructed based on 48 pieces of data constituting a region excluding the bottom right 4×4 region among the 8×8 regions. Here, when a matrix operation is performed by applying a maximum 16×48 transform kernel matrix, 16 modified transform coefficients are generated, and the 16 modified transform coefficients may be arranged in a top-left 4×4 region according to a scanning order, and a top-right 4×4 region and a bottom-left 4×4 region may be filled with zeros.

For an inverse transform in a decoding process, the transposed matrix of the foregoing transform kernel matrix may be used. That is, when an inverse RST or LFNST is performed in the inverse transform process performed by the decoding apparatus, input coefficient data to which the inverse RST is applied is configured in a one-dimensional vector according to a predetermined arrangement order, and a modified coefficient vector obtained by multiplying the one-dimensional vector and a corresponding inverse RST matrix on the left of the one-dimensional vector may be arranged in a two-dimensional block according to a predetermined arrangement order.

In summary, in the transform process, when an RST or LFNST is applied to an 8×8 region, a matrix operation of 48 transform coefficients in top-left, top-right, and bottom-left regions of the 8×8 region excluding the bottom-right region among transform coefficients in the 8×8 region and a 16×48 transform kernel matrix. For the matrix operation, the 48 transform coefficients are input in a one-dimensional array. When the matrix operation is performed, 16 modified transform coefficients are derived, and the modified transform coefficients may be arranged in the top-left region of the 8×8 region.

On the contrary, in the inverse transform process, when an inverse RST or LFNST is applied to an 8×8 region, 16 transform coefficients corresponding to a top-left region of the 8×8 region among transform coefficients in the 8×8 region may be input in a one-dimensional array according to a scanning order and may be subjected to a matrix operation with a 48×16 transform kernel matrix. That is, the matrix operation may be expressed as (48×16 matrix)*(16×1 transform coefficient vector)=(48×1 modified transform coefficient vector). Here, an n×1 vector may be interpreted to have the same meaning as an n×1 matrix and may thus be expressed as an n×1 column vector. Further, * denotes matrix multiplication. When the matrix operation is performed, 48 modified transform coefficients may be derived, and the 48 modified transform coefficients may be arranged in top-left, top-right, and bottom-left regions of the 8×8 region excluding a bottom-right region.

According to an example, syntax elements for MIP may be signaled in a coding unit syntax table as in Table 4.

TABLE 4

```
                                                                Descriptor
coding_unit( x0, y0, cbWidth, cbHeight, cqtDepth, treeType,
modeType ) {
  ......
  if( CuPredMode[ chType ][ x0 ][ y0 ] = = MODE_INTRA
&& sps_palette_enabled_flag &&
      cbWidth <= 64 && cbHeight <= 64 &&
cu_skip_flag[ x0 ][ y0 ] = = 0 &&
      modeType != MODE_TYPE_INTER && ( (
      cbWidth * cbHeight ) >
      ( treeType != DUAL_TREE_CHROMA ? 16 : 16 *
      SubWidthC * SubHeightC ) ) &&
      ( modeType != MODE_TYPE_INTRA | | treeType
!=DUAL_TREE_CHROMA ) )
    pred_mode_plt_flag                                          ae(v)
  if( CuPredMode[ chType ][ x0 ][ y0 ] = = MODE_INTRA
  && sps_act_enabled_flag &&
      treeType = = SINGLE_TREE )
    cu_act_enabled_flag                                         ae(v)
  if( CuPredMode[ chType ][ x0 ][ y0 ] = = MODE_INTRA
  | |
      CuPredMode[ chType ][ x0 ][ y0 ] = =
      MODE_PLT ) {
    if( treeType = = SINGLE_TREE | | treeType = =
    DUAL_TREE_LUMA ) {
      if( pred_mode_plt_flag )
        palette_coding( x0, y0, cbWidth, cbHeight,
        treeType )
      else {
        if( sps_bdpcm_enabled_flag &&
            cbWidth <= MaxTsSize && cbHeight <=
            MaxTsSize )
          intra_bdpcm_luma_flag                                 ae(v)
        if( intra_bdpcm_luma_flag )
          intra_bdpcm_luma_dir_flag                             ae(v)
        else {
          if( sps_mip_enabled_flag )
            intra_mip_flag[ x0 ][ y0 ]                          ae(v)
          if( intra_mip_flag[ x0 ][ y0 ] ) {
            intra_mip_transposed_flag[ x0 ][ y0 ]               ae(v)
            intra_mip_mode[ x0 ][ y0 ]                          ae(v)
          } else {
            if( sps_mrl_enabled_flag && ( ( y0 %
            CtbSizeY ) > 0 ) )
              intra_luma_ref_idx[ x0 ][ y0 ]                    ae(v)
            if( sps_isp_enabled_flag &&
            intra_luma_ref_idx[ x0 ][ y0 ] = = 0 &&
                ( cbWidth <= MaxTbSizeY &&
                cbHeight <= MaxTbSizeY ) &&
                ( cbWidth * cbHeight > MinTbSizeY *
                MinTbSizeY ) &&
                !cu_act_enabled_flag )
              intra_subpartitions_mode_flag[ x0 ][ y0 ]         ae(v)
            if( intra_subpartitions_mode_flag[ x0 ][ y0
            ] = = 1 )
              intra_subpartitions_split_flag[ x0 ][ y0 ]        ae(v)
            if( intra_luma_ref_idx[ x0 ][ y0 ] = = 0 )
              intra_luma_mpm_flag[ x0 ][ y0 ]                   ae(v)
            if( intra_luma_mom_flag[ x0 ][ y0 ] ) {
              if( intra_luma_ref_idx[ x0 ][ y0 ] = = 0 )
                intra_luma_not_planar_flag[ x0 ][ y0            ae(v)
                ]
              if( intra_luma_not_planar_flag[ x0 ][ y0
              ] )
                intra_luma_mpm_idx[ x0 ][ y0 ]                  ae(v)
            } else
              intra_luma_mpm_remainder[ x0 ][ y0 ]              ae(v)
          }
        }
      }
    }
  ......
```

TABLE 4-continued

```
                                                                Descriptor
  } else if( treeType != DUAL_TREE_CHROMA ) { /*
  MODE_INTER or MODE_IBC */
    ......
  }
  if( CuPredMode[ chType ][ x0 ][ y0 ] != MODE_INTRA
  && !pred_mode_plt_flag &&
      general_merge_flag[ x0 ][ y0 ] = = 0 )
    cu_coded_flag                                               ae(v)
  if( cu_coded_flag ) {
    ......
    if( sps_act_enabled_flag && CuPredMode[ chType
][ x0 ][ y0 ] != MODE_INTRA &&
        treeType = = SINGLE_TREE )
      cu_act_enabled_flag                                       ae(v)
    LfnstDcOnly = 1
    LfnstZeroOutSigCoeffFlag = 1
    MtsDcOnly = 1
    MtsZeroOutSigCoeffFlag = 1
    transform_tree( x0, y0, cbWidth, cbHeight, treeType,
    chType )
    lfnstWidth = ( treeType = = DUAL_TREE_CHROMA
    ) ? cbWidth / SubWidthC :
                    ( ( IntraSubPartitionsSplitType = =
                    ISP_VER_SPLIT ) ?
                      cbWidth / NumIntraSubPartitions :
                      cbHeight )
    lfnstHeight = ( treeType = = DUAL_TREE_CHROMA
    ) ? cbHeight / cbHeightC :
                    ( ( IntraSubPartitionsSplitType = =
                    ISP_HOR_SPLIT) ?
                      cbHeight / NumIntraSubPartitions :
                      cbHeight )
    lfnstNotTsFlag = ( treeType = =
    DUAL_TREE_CHROMA | |
                        !tu_y_coded_flag[ x0 ][ y0 ] | |
                        transform_skip_flag[ x0 ][ y0 ][
                        0 ] = = 0 ) &&
                      ( treeType = = DUAL_TREE_LUMA
                      | |
                        ( ( !tu_cb_coded_flag[ x0 ][ y0 ]
                        | |
                        transform_skip_flag[ x0 ][ y0 ][
                        1 ] = = 0 ) &&
                        ( !tu_cr_coded_flag[ x0 ][ y0 ] | |
                        transform_skip_flag[ x0 ][ y0 ][ 2 ]
                        = = 0 ) ) )
    if( Min( lfnstWidth, lfnstHeight ) >= 4 &&
    sps_lfnst_enabled_flag = = 1 &&
        CuPredMode[ chType ][ x0 ][ y0 ] = =
MODE_INTRA && lfnstNotTsFlag = = 1 &&
        ( treeType = = DUAL_TREE_CHROMA | |
        !intra_mip_flag[ x0 ][ y0 ] | |
          Min( lfnstWidth, lfnstHeight ) >= 16 ) &&
        Max( cbWidth, cbHeight ) <= MaxTbSizeY) {
      if( ( IntraSubPartitionsSplitType != ISP_NO_SPLIT
      | | LfnstDcOnly = = 0 ) &&
          LfnstZeroOutSigCoeffFlag = = 1 )
        lfnst_idx                                               ae(v)
    }
    if( treeType != DUAL_TREE_CHROMA &&
    lfnst_idx = = 0 &&
        transform_skip_flag[ x0 ][ y0 ][ 0 ] = = 0 &&
        Max( cbWidth, cbHeight ) <= 32
&&
        IntraSubPartitionsSplitType = = ISP_NO_SPLIT
        && cu_sbt_flag = = 0 &&
        MtsZeroOutSigCoeffFlag = = 1 && MtsDcOnly
        = = 0 ) {
      if( ( ( CuPredMode [ chType ][ x0 ][ y0 ] = =
      MODE_INTER &&
          sps_explicit_mts_inter_enabled_flag ) | |
          ( CuPredMode[ chType ][ x0 ][ y0 ] = =
          MODE_INTRA &&
          sps_explicit_mts_intra_enabled_flag ) ) )
        mts_idx                                                 ae(v)
    }
  }
}
```

intra_mip_flag[x0][y0] signaled in the coding unit syntax table of Table 4 is flag information indicating whether an MIP intra mode is applied to a coding unit.

intra_mip_flag[x0][y0] is referenced a plurality of times in specification text as in Table 5 in addition to Table 4, and particularly, the value of intra_mip_flag for a location other than (x0, y0), such as intra_mip_flag[xCb+cbWidth/2][yCb+cbHeight/2] is also referenced.

Here, x0 and y0 indicate an x-coordinate and a y-coordinate based on a luma picture, respectively, the x-coordinate increases from left to right in luma sample units when the leftmost position of the luma picture is defined as 0, and the y-coordinate increases from top to bottom in luma sample units when the top position of the luma picture is defined as 0. The x-coordinate and the y-coordinate may be expressed in a two-dimensional coordinate form, such as (x, y).

However, intra_mip_flag[x0][y0] may be considered valid only for an (x0, y0) position, and (x0, y0) corresponds to the top-left position of the coding unit (CU) for which intra_mip_flag[x0][y0] is signaled. That is, it may be considered that intra_mip_flag[x0][y0] is signaled only for (x0, y0), which is the top-left position as a representative position in the coding unit, for each coding unit.

In Table 5, since intra_mip_flag values for other positions in addition to (x0, y0), which are the top-left position in the coding unit, are referenced (underlined), information of intra_mip_flag values for the positions other than the top-left position need to be filled in.

TABLE 5

......

7.4.11.5 Coding unit semantics

......

intra_mip_flag[ x0 ][ y0 ] equal to 1 specifies that the intra prediction type for luma samples is matrix-based intra prediction. intra_mip_flag[ x0 ][ y0 ] equal to 0 specifies that the intra prediction type for luma samples is not matrix-based intra prediction.

When intra_mip_flag[ x0 ][ y0 ] is not present, it is inferred to be equal to 0.

......

8.4.1 General decoding process for coding units coded in intra prediction mode

......

When treeType is equal to SINGLE_TREE or treeType is equal to DUAL_TREE_LUMA, the decoding process for luma samples is specified as follows:

- If pred_mode_plt_flag is equal to 1, the general decoding process for palette blocks as specified in clause 8.4.5.3 is invoked with ( xCbComp, yCbComp ) set equal to the luma location ( xCb, yCb ), the variable treeType, the variable cIdx set equal to 0, the variable nCbW set equal to cbWidth, the variable nCbH set equal to cbHeight.
- Otherwise (pred_mode_plt_flag is equal to 0), the following applies:

1. The luma intra prediction mode is derived as follows:

- If intra_mip_flag[ xCb ][ yCb ] is equal to 1, IntraPredModeY[ x ][ y ] with x = xCb..xCb + cbWidth − 1 and y = yCb..yCb + cbHeight − 1 is set to be equal to intra_mip_mode[ xCb ][ yCb ].
- Otherwise, the derivation process for the luma intra prediction mode as specified in clause 8.4.2 is invoked with the luma location ( xCb, yCb ), the width of the current coding block in luma samples cbWidth and the height of the current coding block in luma samples cbHeight as input.

......

8.4.2 Derivation process for luma intra prediction mode

......

IntraPredModeY[ xCb ][ yCb ] is derived as follows:

- If intra_luma_not_planar_flag[ xCb ][ yCb ] is equal to 0, IntraPredModeY[ xCb ][ yCb ] is set equal to INTRA_PLANAR.
- Otherwise, if BdpcmFlag[ xCb ][ yCb ][ 0 ] is equal to 1, IntraPredModeY[ xCb ][ yCb ] is set equal to BdpcmDir[ xCb ][ yCb ][ 0 ] ? INTRA_ANGULAR50 : INTRA_ANGULAR18.
- Otherwise (intra_luma_not_planar_flag[ xCb ][ yCb ] is equal to 1), the following ordered steps apply:
  1. The neighbouring locations ( xNbA, yNbA ) and ( xNbB, yNbB ) are set equal to ( xCb − 1, yCb + cbHeight − 1 ) and ( xCb + cbWidth − 1, yCb − 1 ), respectively.
  2. For X being replaced by either A or B, the variables candIntraPredModeX are derived as follows:
     - The derivation process for neighbouring block availability as specified in clause 6.4.4 is invoked with the location ( xCurr, yCurr ) set equal to ( xCb, yCb ), the neighbouring location ( xNbY, yNbY ) set equal to ( xNbX, yNbX ), checkPredModeY set equal to FALSE, and cIdx set equal to 0 as inputs, and the output is assigned to availableX.
     - The candidate intra prediction mode candIntraPredModeX is derived as follows:
       - If one or more of the following conditions are true, candIntraPredModeX is set equal to INTRA_PLANAR.
         - The variable availableX is equal to FALSE.
         - CuPredMode[ 0 ][ xNbX ][ yNbX ] is not equal to MODE_INTRA.
         - intra_mip_flag[ xNbX ][ yNbX ] is equal to 1.
         - X is equal to B and yCb − 1 is less than ( ( yCb >> CtbLog2SizeY ) << CtbLog2SizeY ).
       - Otherwise, candIntraPredModeX is set equal to IntraPredModeY[ xNbX ][ yNbX ].

......

8.4.3 Derivation process for chroma intra prediction mode

......

If treeType is equal to SINGLE_TREE, ChromaArrayType is equal to 3, intra_chroma_pred_mode is equal to 4, and intra_mip_flag[ xCb + cbWidth / 2 ][ yCb + cbHeight / 2 ] [Ed. (SL): to clarify whether or why "+ cbWidth / 2" and "+ cbHeight / 2" are needed.] is equal to 1, the following applies:

- The MIP chroma direct mode flag MipChromaDirectFlag[ xCb ][ yCb ] is set equal to 1.
- The chroma intra prediction mode IntraPredModeC[ xCb ][ yCb ] is set equal to IntraPredModeY[ xCb + cbWidth / 2 ][ yCb + cbHeight / 2 ] [Ed. (SL): to clarify whether or why "+ cbWidth / 2" and "+ cbHeight / 2" are needed.].

TABLE 5-continued

Otherwise, the following applies:
- The MIP chroma direct mode flag MipChromaDirectFlag[ xCb ][ yCb ] is set equal to 0.
- The corresponding luma intra prediction mode lumaIntraPredMode is derived as follows:
  - If intra_mip_flag[ xCb + cbWidth / 2 ][ yCb + cbHeight / 2 ] is equal to 1, lumaIntraPredMode is set equal to INTRA_PLANAR.
  - Otherwise, if CuPredMode[ 0 ][ xCb + cbWidth / 2 ][ yCb + cbHeight / 2 ] is equal to MODE_IBC or MODE_PLT, lumaIntraPredMode is set equal to INTRA_DC.
  - Otherwise, lumaIntraPredMode is set equal to IntraPredModeY[ xCb + cbWidth / 2 ][ yCb + cbHeight / 2 ].

......

8.4.5.2 Intra sample prediction

......

The predicted samples predSamples[ x ][ y ] are derived as follows:
- If intra_mip_flag[ xTbComp ][ yTbComp ] is equal to 1 and cIdx is equal to 0, or if MipChromaDiractFlag[ xTbComp ][ yTbComp ] is equal to 1 and cIdx is not equal to 0, the matrix-based intra sample prediction process as specified in clause 8.4.5.2.1 is invoked with the location ( xTbCmp, yTbCmp ), the intra prediction mode predModeIntra, the transform block width nTbW and height nTbH, and the variable cIdx as inputs, and the output is predSamples.
- Otherwise, the general intra sample prediction process as specified in clause 8.4.5.2.5 is invoked with the location ( xTbCmp, yTbCmp ), the intra prediction mode predModeIntra, the transform block width nTbW and height nTbH, the coding block width nCbW and height nCbH, and the variable cIdx as inputs, and the output is predSamples.

......

8.7.4 Transformation process for scaled transform coefficients 8.7.4.1 General

......

When ApplyLfnstFlag is equal to 1, transform_skip_flag[ xTbY ][ yTbY ][ cIdx ] is equal to 0 and both nTbW and nTbH are greater than or equal to 4, the following applies:
- The variables predModeIntra, nLfnstOutSize, log2LfnstSize, nLfnstSize, and nonZeroSize are derived as follows:

predModeIntra =
  ( cIdx = = 0 ) ? IntraPredModeY[ xTbY ][ yTbY ] : IntraPredModeC[ xTbY ][ yTbY ] (1178)

nLfnstOutSize = ( nTbW >= 8 && nTbH >= 8 ) ? 48 : 16 (1179)

log2LfnstSize = ( nTbW >= 8 && nTbH >= 8 ) ? 3 : 2 (1180)

nLfnstSize =
  1 << log2LfnstSize (1181)

nonZeroSize = ( ( nTbW = = 4 && nTbH = = 4 ) | |
  ( nTbW = = 8 && nTbH = = 8 ) ) ? 8 : 16 (1182)

- When intra_mip_flag[ xTbY ][ yTbY ] is equal to 1 and cIdx is equal to 0, predModeIntra is set equal to INTRA_PLANAR.
- When predModeIntra is equal to either INTRA_LT_CCLM, INTRA_L_CCLM, or INTRA_T_CCLM, predModeIntra is derived as follows:
  - If intra_mip_flag[ xTbY + nTbW * SubWidthC / 2 ][ yTbY + nTbH * SubHeightC / 2 ] is equal to 1, predModeIntra is set equal to INTRA_PLANAR.
  - Otherwise, if CuPredMode[ 0 ][ xTbY + nTbW * SubWidthC / 2 ][ yTbY + nTbH * SubHeightC / 2 ] is equal to MODE_IBC or MODE_PLT, predModeIntra is set equal to INTRA_DC.
  - Otherwise, predModeIntra is set equal to IntraPredModeY[ xTbY + nTbW * SubWidthC / 2 ][ yTbY + nTbH * SubHeightC / 2 ].

......

The variable implicitMtsEnabled is derived as follows:
- If sps_mts_enabled_flag is equal to 1 and one or more of the following conditions are true, implicitMtsEnabled is set equal to 1:
  - IntraSubPartitionsSplitType is not equal to ISP_NO_SPLIT
  - cu_sbt_flag is equal to 1 and Max( nTbW, nTbH ) is less than or equal to 32
  - sps_explicit_mts_intra_enabled_flag is equal to 0 and CuPredMode[ 0 ][ xTbY ][ yTbY ] is equal to MODE_INTRA and lfnst_idx[ x0 ][ y0 ] is equal to 0 and intra_mip_flag[ xTbY ][ yTbY ] is equal to 0.

......

Table 132 Specification of ctxInc using left and above syntax elements

| Syntax element | condL | condA | ctxSetIdx |
|---|---|---|---|
| alf_ctb_flag[ cIdx ][ xCtb ][ yCtb ] | alf_ctb_flag[ cIdx ][ xCtbL ][ yCtbL ] | alf_ctb_flag[cIdx ][ xCtbA ][ yCtbA ] | cIdx |
| alf_ctb_cc_cb_idc[ xCtb ][ yCtb ] | alf_ctb_cc_cb_idc[ xCtbL ][ yCtbL ] | alf_ctb_cc_cb_idc[ xCtbA ][ yCtbA ] | 0 |
| alf_ctb_cc_cr_idc[ xCtb ][ yCtb ] | alf_ctb_cc_cr_idc[ xCtbL ][ yCtbL ] | alf_ctb_cc_cr_idc[ xCtbA ][ yCtbA ] | 0 |
| split_qt_flag | CqtDepth[ chType ][ xNbL ][ yNbL ] > cqtDepth | CqtDepth[ chType ][ xNbA ][ yNbA ] > cqtDepth | cqtDepth >= 2 |
| split_cu_flag | CbHeight[ chType ][ xNbL ][ yNbL ] < cbHeight | CbWidth[ chType ][ xNbA ][ yNbA ] < cbWidth | ( allowSplitBtVer + allowSplitBtHor + allowSplitTtVer + allowSplitTtHor + 2 * allowSplitQt − 1 ) / 2 |

TABLE 5-continued

| | | | |
|---|---|---|---|
| mode_constraint_flag | CuPredMode[ chType ][ xNbL ][ yNbL ] = = MODE_INTRA | CuPredMode[ chType ][ xNbA ][ yNbA ] = = MODE_INTRA | 0 |
| cu_skip_flag[ x0 ][ y0 ] | cu_skip_flag[ xNbL ][ yNbL ] | cu_skip_flag[ xNbA ][ yNbA ] | 0 |
| pred_mode_flag[ x0 ][ y0 ] | CuPredMode[ chType ][ xNbL ][ yNbL ] = = MODE_INTRA | CuPredMode[ chType ][ xNbA ][ yNbA ] = = MODE_INTRA | 0 |
| pred_mode_ibc_flag[ x0 ][ y0 ] | CuPredMode[ chType ][ xNbL ][ yNbL ] = = MODE_IBC | CuPredMode[ chType ][ xNbA ][ yNbA ] = = MODE_IBC | 0 |
| intra_mip_flag[ x0 ][ y0 ] | intra_mip_flag[ xNbL ][ yNbL ] | intra_mip_flag[ xNbA ][ yNbA ] | 0 |
| merge_subblock_flag[ x0 ][ y0 ] | merge_subblock_flag[ xNbL ][ yNbL ] \| \| inter_affine_flag[ xNbL ][ yNbL ] | merge_subblock_flag[ xNbA ][ yNbA ] \| \| inter_affine_flag[ xNbA ][ yNbA ] | 0 |
| inter_affine_flag[ x0 ][ y0 ] | merge_subblock_flag[ xNbL ][ yNbL ] \| \| inter_affine_flag[ xNbL ][ yNbL ] | merge_subblock_flag[ xNbA ][ yNbA ] \| \| inter_affine_flag[ xNbA ][ yNbA ] | 0 |
| ...... | | | |

As in Table 4 and Table 5, intra_mip_flag is defined as a syntax element, and as in the semantics of intra_mip_flag illustrated in Table 5 (7.4.11.5 Coding unit semantics), intra_mip_flag is inferred to 0 when not present.

The value of intra_mip_flag may be used when deriving an intra prediction mode (8.4.1 and 8.4.2). For example, as described in 8.4.2, the value of intra_mip_flag for a neighboring block or a specific position in the neighboring block may be used (intra_mip_flag[xNbX][yNbX] is equal to 1).

Further, as described in 8.3.4, when deriving an intra prediction mode for a chroma block, the value of intra_mip_flag for the position of a corresponding luma block may be used (-The chroma intra prediction mode IntraPredModeC[xCb][yCb] is set equal to IntraPredModeY [xCb+cbWidth/2][yCb+cbHeight/2]).

In addition, the value of intra_mip_flag may be used not only in intra prediction but also in a transformation process (8.7.4.1—When intra_mip_flag[xTbY][yTbY] is equal to 1 and cIdx is equal to 0, predModeIntra is set equal to INTRA_PLANAR), and the value of intra_mip_flag for a neighboring block may be used in a process of deriving the context index of a target block to be coded (Table 132: Specification of ctxInc using left and above syntax elements).

Accordingly, ambiguity may arise in a method of filling in intra_mip_flag array variable values in positions other than (x0, y0) considering intra_mip_flag as a two-dimensional array variable. That is, since the semantics states that intra_mip_flag[x0][y0] is inferred to 0 when not present, filling in any non-zero value in an unfilled position in the intra_mip_flag array may be ambiguous, that is, uncertain.

Therefore, according to an example, it may be proposed to define a separate two-dimensional array, such as IntraLumaMipFlag[x][y] as shown in Table 6, and to utilize the same in a subsequent image coding process.

TABLE 6

```
......
7.4.11.5 Coding unit semantics
......
intra__mip__flag[ x0 ][ y0 ] equal to 1 specifies that the intra prediction
type for luma samples in matrix-based intra prediction. intra__mip__flag[
x0 ][ y0 ] equal to 0 specifies that the intra pedictions type for luma
samples is not matrix-based intra prediction.
When intra__mip__flag[ x0 ][ y0 ] is not present , it is inferred to be equal
to 0.
When treeType is not equal to DUAL__TREE__CHROMA, the variable
IntraLumaMipFlag[ x ][ y ] is set equal to intra__mip__flag[ x0 ][ y0 ] for
x = x0..x0 + cbWidth − 1 and y = y0..y0 + cbHeight − 1.
......
```

In Table 6, (x0, y0) indicates the top-left position of the coding unit (CU) currently coded, and cbWidth and cbHeight indicate the width and height of the coding unit, respectively. Further, "x=x0 . . . x0+cbWidth−1" means that an x-coordinate value changes from x0 to x0+cbWidth−1, and "y=y0 . . . y0+cbHeight−1" means that a y-coordinate value changes from y0 to y0+cbHeight−1. Accordingly, in an IntraLumaMipFlag[x][y] array in Table 6, a region corresponding to the coding unit is filled with an intra_mip_flag [x0][y0] value.

According to an example, all parts (underlined) referencing intra_mip_flag information in the current VVC specification text may be substituted or modified with an IntraLumaMipFlag variable as shown in Table 7.

TABLE 7

```
......
7.3.10.5                Coding unit syntax
    coding_unit( x0, y0, cbWidth, cbHeight, cqtDepth, treeType, modeType ) {
        ......
        if( Min( lfnstWidth, lfnstHeight ) >= 4 && sps_lfnst_enabled_flag = = 1 &&
                CuPredMode[ chType ][ x0 ][ y0 ] = = MODE_INTRA && lfnstNotTsFlag
                  = = 1 &&
                ( treeType = = DUAL_TREE_CHROMA | | ! IntraLumaMipFlag[ x0 ][ y0 ] | |
                    Min( lfnstWidth, lfnstHeight ) >= 16 ) &&
                Max( cbWidth, cbHeight ) <= MaxTbSizeY) {
            if( ( IntraSubPartitionsSplitType != ISP_NO_SPLIT | | LfnstDcOnly = = 0 ) &&
                    LfnstZeroOutSigCoeffFlag = = 1 )
                lfnst_idx
            }
        ......
        }
    }
......
```

TABLE 7-continued 8.4.1 General decoding process for coding units coded in intra prediction mode
...
When treeType is equal to SINGLE_TREE or treeType is equal to DUAL_TREE_LUMA, the decoding process for luma samples is specified as follows:
- If pred_mode_plt_flag is equal to 1, the general decoding process for palette blocks as specified in clause 8.4.5.3 is invoked with ( xCbComp, yCbComp ) set equal to the luma location ( xCb, yCb ), the variable treeType, the variable cIdx set equal to 0, the variable nCbW set equal to cbWidth, the variable nCbH set equal to cbHeight.
- Otherwise (pred_mode_plt_flag is equal to 0), the following applies:
1. The luma intra prediction mode is derived as follows:
- If IntraLumaMipFlag[ xCb ][ yCb ] is equal to 1, IntraPredModeY[ x ][ y ] with x = xCb..xCb + cbWidth − 1 and y = yCb..yCb + cbHeight − 1 is set to be equal to intra_mip_mode[ xCb ][ yCb ].
- Otherwise, the derivation process for the luma intra prediction mode as specified in clause 8.4.2 is invoked with the luma location ( xCb, yCb ), the width of the current coding block in luma samples cbWidth and the height of the current coding block in luma samples cbHeight as input.
8.4.2 Derivation process for luma intra prediction mode
......
IntraPredModeY[ xCb ][ yCb ] is derived as follows:
- If intra_luma_not_planar_flag[ xCb ][ yCb ] is equal to 0, IntraPredModeY[ xCb ][ yCb ] is set equal to INTRA_PLANAR.
- Otherwise, if BdpcmFlag[ xCb ][ yCb ][ 0 ] is equal to 1, IntraPredModeY[ xCb ][ yCb ] is set equal to BdpcmDir[ xCb ][ yCb ][ 0 ] ? INTRA_ANGULAR50 : INTRA_ANGULAR18.
- Otherwise (intra_luma_not_planar_flag[ xCb ][ yCb ] is equal to 1), the following ordered steps apply:
  1. The neighbouring locations ( xNbA, yNbA ) and ( xNbB, yNbB ) are set equal to ( xCb − 1, yCb + cbHeight − 1 ) and ( xCb + cbWidth − 1, yCb − 1 ), respectively.
  2. For X being replaced by either A or B, the variables candIntraPredModeX are derived as follows:
     - The derivation process for neighbouring block availability as specified in clause 6.4.4 is invoked with the location ( xCurr, yCurr ) set equal to ( xCb, yCb ), neighbouring location ( xNbY, yNbY ) set equal to ( xNbX, yNbX ), checkPredModeY set equal to FALSE, and cIdx set equal to 0 as inputs, and the output is assigned to availableX.
     - The candidate intra prediction mode candIntraPredModeX is derived as follows:
       - If one or more of the following conditions are true, candIntraPredModeX is set equal to INTRA_PLANAR.
         - The variable availableX is equal to FALSE.
         - CuPredMode[ 0 ][ xNbX ][ yNbX ] is not equal to MODE_INTRA.
         - IntraLumaMipFlag[ xNbX ][ yNbX ] is equal to 1.
         - X is equal to B and yCb − 1 is less than ( ( yCb >> CtbLog2SizeY ) << CtbLog2SizeY ).
       - Otherwise, candIntraPredModeX is set equal to IntraPredModeY[ xNbX ][ yNbX ].

......
8.4.3 Derivation process for chroma intra prediction mode
......
If treeType is equal to SINGLE_TREE, ChromaArrayType is equal to 3, intra_chroma_pred_mode is equal to 4, and IntraLumaMipFlag[ xCb + cbWidth / 2 ][ yCb + cbHeight / 2 ] [Ed. (SL): to clarify whether or why "+ cbWidth / 2" and "+ cbHeight / 2" are needed.] is equal to 1, the following applies:
- The MIP chroma direct mode flag MipChromaDirectFlag[ xCb ][ yCb ] is set equal to 1.
- The chroma intra prediction mode IntraPredModeC[ xCb ][ yCb ] is set equal to IntraPredModeY[ xCb + chWidth / 2 ][ yCb + cbHeight / 2 ] [Ed. (SL): to clarify whether or why "+ cbWidth / 2" and "+ cbHeight / 2" are needed.].

Otherwise, the following applies:
- The MIP chroma direct mode flag MipChromaDirectFlag[ xCb ][ yCb ] is set equal to 0.
- The corresponding luma intra prediction mode lumaIntraPredMode is derived as follows:
  - If IntraLumaMipFlag[ xCb + cbWidth / 2 ][ yCb + cbHeight / 2 ] is equal to 1, lumaIntraPredMode is set equal to INTRA_PLANAR.
  - Otherwise, if CuPredMode[ 0 ][ xCb + cbWidth / 2 ][ yCb + cbHeight / 2 ] is equal to MODE_IBC or MODE_PLT, lumaIntraPredMode is set equal to INTRA_DC.
  - Otherwise, lumaIntraPredMode is set equal to IntraPredModeY[ xCb + cbWidth / 2 ][ yCb + cbHeight / 2 ].

......
8.4.5.2 Intra sample prediction
......
The predicted samples predSamples[ x ][ y ] are derived as follows:
- If IntraLumaMipFlag[ xTbComp ][ yTbComp ] is equal to 1 and cIdx is equal to 0, or if MipChromaDirectFlag[ xTbComp ][ yTbComp ] is equal to 1 and cIdx is not equal to 0, the matrix-based intra sample prediction process as specified is clause 8.4.5.2.1 is invoked with the location ( xTbCmp, yTbCmp ), the intra prediction mode predModeIntra, the transform block width nTbW and height nTbH, and the variable cIdx as inputs, and the output is predSamples.
- Otherwise, the general intra sample prediction process as specified in clause 8.4.5.2.5 is invoked with the location ( xTbCmp, yTbCmp ), the intra prediction mode predModeIntra, the transform block width nTbW and height nTbH, the coding block width nCbW and height nCbH, and the variable cIdx as inputs, and the output is predSamples.

......
8.7.4 Transformation process for scaled transform coefficients
8.7.4.1 General
......
When ApplyLfnstFlag is equal to 1, transform_skip_flag[ xTbY ][ yTbY ][ cIdx ] is equal to 0 and both nTbW and nTbH are greater than or equal to 4, the following applies:

TABLE 7-continued

```
-   The variables predModeIntra, nLfnstOutSize, log2LfnstSise, nLfnstSize, and nonZeroSize are
    derived as follows:
      predModeIntra =
      ( cIdx = = 0 ) ? IntraPredModeY[ xTbY ][ yTbY ] : IntraPredModeC[ xTbY ][ yTbY ] (
      1178)
      nLfnstOutSize = ( nTbW >= 8 && nTbH >= 8 ) ? 48 : 16                    (1179)
      log2LfnstSize = ( nTbW >= 8 && nTbH >= 8 ) ? 3 : 2                      (1180)
      nLfnstSize =
      1 << log2LfnstSize                                                       (1181)
      nonZeroSize = ( ( nTbW = = 4 && nTbH = = 4 ) | |
      ( nTbW = = 8 && nTbH = = 8 ) ) ? 8 : 16                                  (1182)
-   When IntraLumaMipFlag[ xTbY ][ yTbY ] is equal to 1 and cIdx is equal to 0, predModeIntra is
    set equal to INTRA_PLANAR.
-   When predModeIntra is equal to either INTRA_LT_CCLM, INTRA_L_CCLM, or
    INTRA_T_CCLM, predModeIntra is derived as follows:
    -     If IntraLumaMipFlag[ xTbY + nTbW * SubWidthC / 2 ][ yTbY + nTbH * SubHeightC / 2 ]
          is equal to 1, predModeIntra is set equal to INTRA_PLANAR.
    -     Otherwise, if
          CuPredMode[ 0 ][ xTbY + nTbW * SubWidthC / 2 ][ yTbY + nTbH * SubHeightC / 2 ] is
          equal to MODE_IBC or MODE_PLT, predModeIntra is set equal to INTRA_DC.
    -     Otherwise, predModeIntra is set equal to
          IntraPredModeY[ xTbY + nTbW * SubWidthC / 2 ][ yTbY + nTbH * SubHeightC / 2 ].
......
The variable implicitMtsEnabled is derived as follows:
-   If sps_mts_enabled_flag is equal to 1 and one or more of the following conditions are true,
    implicitMtsEnabled is set equal to 1:
    -     IntraSubPartitionsSplitType is not equal to ISP_NO_SPLIT
    -     cu_sbt_flag is equal to 1 and Max( nTbW, nTbH ) is less than or equal to 32
    -     sps_explicit_mts_intra_enabled_flag is equal to 0 and CuPradMode[ 0 ][ xTbY ][ yTbY ] is
          equal to MODE_INTRA and lfnst_idx[ x0 ][ y0 ] is equal to 0 and
          IntraLumaMipFlag[ xTbY ][ yTbY ] is equal to 0.
......
```

Table 132 Specification of ctxInc using left and above syntax elements

| Syntax element | condL | condA | ctxSetIdx |
|---|---|---|---|
| alf_ctb_flag[ cIdx ][ xCtb ][ yCtb ] | alf_ctb_flag[ cIdx ][ xCtbL ][ yCtbL ] | alf_ctb_flag[ cIdx ][ xCtbA ][ yCtbA ] | cIdx |
| alf_ctb_cc_cb_idc[ xCtb ][ yCtb ] | alf_ctb_cc_cb_idc[ xCtbL ][ yCtbL ] | alf_ctb_cc_cb_idc[ xCtbA ][ yCtbA ] | 0 |
| alf_ctb_cc_cr_idc[ xCtb ][ yCtb ] | alf_ctb_cc_cr_idc[ xCtbL ][ yCtbL ] | alf_ctb_cc_cr_idc[ xCtbA ][ yCtbA ] | 0 |
| split_qt_flag | CqtDepth[ chType ][ xNbL ][ yNbL ] > cqtDepth | CqtDepth[ chType ][ xNbA ][ yNbA ] > cqtDepth | cqtDepth >= 2 |
| split_cu_flag | CbHeight[ chType ][ xNbL ][ yNbL ] < cbHeight | CbWidth[ chType ][ xNbA ][ yNbA ] < cbWidth | ( allowSplitBtVer + allowSplitBtHor + allowSplitTtVer + allowSplitTtHor + 2 * allowSplitQt − 1 ) / 2 |
| mode_constraint_flag | CuPredMode[ chType ][ xNbL ][ yNbL ] = = MODE_INTRA | CuPredMode[ chType ][ xNbA ][ yNbA ] = = MODE_INTRA | 0 |
| cu_skip_flag[ x0 ][ y0 ] | cu_skip_flag[ xNbL ][ yNbL ] | cu_skip_flag[ xNbA ][ yNbA ] | 0 |
| pred_mode_flag[ x0 ][ y0 ] | CuPredMode[ chType ][ xNbL ][ yNbL ] = = MODE_INTRA | CuPredMode[ chType ][ xNbA ][ yNbA ] = = MODE_INTRA | 0 |
| pred_mode_ibc_flag[ x0 ][ y0 ] | CuPredMode[ chType ][ xNbL ][ yNbL ] = = MODE_IBC | CuPredMode[ chType ][ xNbA ][ yNbA ] = = MODE_IBC | 0 |
| intra_mip_flag[ x0 ][ y0 ] | IntraLumaMipFlag[ xNbL ][ yNbL ] | IntraLumaMipFlag[ xNbA ][ yNbA ] | 0 |
| merge_subblock_flag[ x0 ][ y0 ] | merge_subblock_flag[ xNbL ][ yNbL ] \| \| inter_affine_flag[ xNbL ][ yNbL ] | merge_subblock_flag[ xNbA ][ yNbA ] \| \| inter_affine_flag[ xNbA ][ yNbA ] | 0 |
| inter_affine_flag[ x0 ][ y0 ] | merge_subblock_flag[ xNbL ][ yNbL ] \| \| inter_affine_flag[ xNbL ][ yNbL ] | merge_subblock_flag[ xNbA ][ yNbA ] \| \| inter_affine_flag[ xNbA ][ yNbA ] | 0 |
| ...... | | | |

In Table 7, a case in which IntraLumaMipFlag information for the top-left position in the coding unit is certainly reference may be described using existing intra_mip_flag as it is. Table 8 shows only a part that may use existing intra_mip_flag as it is extracted from Table 7.

TABLE 8

```
......
7.3.10.5 Coding unit syntax
  coding_unit( x0, y0, cbWidth, cbHeight, cqtDepth, treeType, modeType ) {
    ......
    if( Min( lfnstWidth, lfnstHeight ) >= 4 && sps_lfnst_enabled_flag == 1 &&
        CuPredMode[ chType ][ x0 ][ y0 ] == MODE_INTRA && lfnstNotTsFlag
```

TABLE 8-continued

```
== 1 &&
          (treeType == DUAL_TREE_CHROMA || !intra_mode_flag[ x0 ][ y0 ]
||
             Min( lfnstWidth, lfnstHeight ) >= 16 ) &&
          Max( cbWidth, cbHeight ) <= MaxTbSizeY) (
       if( ( IntraSubPartitionsSplitType != ISP_NO_SPLIT || LfnstDcOnly ==
0 ) &&
             LfnstZeroOutSigCoeffFlag == 1 )
          lfnst_idx
     }
   ......
   }
}
......
```

8.4.1 General decoding process for coding units coded in intra prediction mode

......

When treeType is equal to SINGLE_TREE or treeType is equal to DUAL_TREE_LUMA the decoding process for luma samples is specified as follows:

- If pred_mode_plt_flag is equal to 1, the general decoding process for palette blocks as specified in clause 8.4.5.3 is invoked with ( xCbComp, yCbComp ) set equal to the luma location ( xCb, yCb ), the variable treeType, the variable cIdx set equal to 0, the variable nCbW set equal to cbWidth, the variable nCbH set equal to cbHeight.
- Otherwise (pred_mode_plt_flag is equal to 0), the following applies:

1. The luma intra pediction mode is derived as follows:

- If intra_mip_flag[ xCb ][ yCb ] is equal to 1, IntraPredModeY[ x ][ y ] with x = xCb..xCb + cbWidth − 1 and y = yCb..yCb + cbHeight − 1 is set to be equal to intra_mip_mode[ xCb ][ yCb ].
- Otherwise, the derivation process for the luma intra prediction mode as specified to clause 8.4.2 is invoked with the luma location ( xCb, yCb ), the width of the current coding block in luma samples cbWidth and the height of the current coding block in luma samples cbHeight as input.

......

In Table 4, the same problem may occur with respect to intra_subpartitions_mode_flag other than intra_mip_flag in the current VVC specification text. That is, intra_subpartitions_mode_flag information for a position other than the top-left position (x0, y0) in the coding unit is referenced, which is shown in Table 9 (indicated by an underline).

Therefore, it may be configured to define a two-dimensional array variable of IntraSubPartitionsModeFlag[x][y] in a similar manner to the IntraLumaMipFlag variable, to fill all positions in the coding unit with necessary information, and then to refer to an appropriate value for any position. That is, all positions in the coding unit may be filled with corresponding intra_subpartitions_mode_flag[x0][y0] values.

Table 10 shows that a part (underlined) referring to intra_subpartitions_mode_flag using the IntraSubPartitionsModeFlag variable is replaced with the IntraSubPartitionsModeFlag variable. In a case of IntraSubPartitionsModeFlag, when information on the top-left position in the coding unit is referenced, intra_subpartitions_mode_flag may be configured to be referenced as it is.

According to another example, the IntraLumaMipFlag variable or the IntraSubPartitionModeFlag variable presented in this embodiment may have different variable names. That is, these variables may be expressed or referred to as different variables. For example, the IntraLumaMipFlag variable may be referred to as a MipFlag variable.

TABLE 9

......

8.4.4 Cross-component chroma intra prediction mode checking process

Input to this process is:

- a luma location ( xCb, yCb ) specifying the top-left sample of the current chroma coding block relative to the top-left luma sample of the current picture.

Output to this process is:

- a variable CclmEnabled specifying if a cross-component chroma intra prediction mode is enabled (TRUE) or not enabled (FALSE) for the current chroma coding block.

The variable CclmEnabled is derived as follows:

- If sps_cclm_enabled_flag is equal to 0, CclmEnabled is set equal to 0.
- Otherwise, if one or more of the following conditions are true, CclmEnabled is set equal to 1:
  - sps_qtbtt_dual_tree_intra_flag is equal to 0.
  - sh_slice_type is not equal to 1.
  - CtbLog2SizeY is less than 6.
- Otherwise the following applies:
  - The variables xCb64, yCb64, yCb32 are derived as follows:

xCb64 = ( xCb >> 6) << 6 (238)

yCb64 = ( yCb >> 6 ) << 6 (239)

yCb32 = ( yCb >> 5 ) << 5 (240)

TABLE 9-continued

- If one or more of the following conditions are true, the variable CclmEnabled is set equal to 1:
  - CbWidth[ 1 ][ xCb64 ][ yCb64 ] is equal to 64 and CbHeight[ 1 ][ xCb64 ][ yCb64 ] is equal to 64.
  - CqtDepth[ 1 ][ xCb64 ][ yCb64 ] is equal to CtbLog2SizeY − 6, MttSplitMode[ xCb64 ][ yCb64 ][ 0 ] is equal to SPLIT_BT_HOR, CbWidth[ 1 ][ xCb64 ][ yCb32 ] is equal to 64 and CbHeight[ 1 ][ xCb64 ][ yCb32 ] is equal to 32.
  - CqtDepth[ 1 ][ xCb64 ][ yCb64 ] is greater than CtbLog2SizeY − 6.
  - CqtDepth[ 1 ][ xCb64 ][ yCb64 ] is equal to CtbLog2SizeY − 6, MttSplitMode[ xCb64 ][ yCb64 ][ 0 ] is equal to SPLIT_BT_HOR, and MttSplitMode[ xCb64 ][ yCb32 ][ 1 ] is equal to SPLIT_BT_VER.
- Otherwise, the variable CclmEnabled is set equal to 0.

When CclmEnabled is equal to 1 and one of the following conditions is true, CclmEnabled is set equal to 0:
- CbWidth[ 0 ][ xCb64 ][ yCb64 ] and CbHeight[ 0 ][ xCb64 ][ yCb64 ] are both equal to 64, and intra_subpartitions_mode_flag[ xCb64 ][ yCb64 ] is equal to 1.
- CbWidth[ 0 ][ xCb64 ][ yCb64 ] or CbHeight[ 0 ][ xCb64 ][ yCb64 ] is less than 64, and CqtDepth[ 0 ][ xCb64 ][ yCb64 ] is equal to CtbLog2SizeY − 6.

......

TABLE 10

......
7.4.11.5 Coding unit semantics
......
intra_subpartitions_mode_flag[ x0 ][ y0 ] equal to 1 specifies that the current intra coding unit is partitioned into NumIntraSubPartitions[ x0 ][ y0 ] rectangular transform block subpartitions.
intra_subpartitions_mode_flag[ x0 ][ y0 ] equal to 0 specifies that the current intra coding unit is not partitioned into rectangular transform block subpartitions.
When intra_subpartitions_mode_flag[ x0 ][ y0 ] is not present, it is inferred to be equal to 0.
When treeType is not equal to DUAL_TREE_CHROMA, the variable IntraSubPartitionsModeFlag[ x ][ y ] is set equal to intra_subpartitions_mode_flag[ x ][ y ] for x = x0..x0 + cbWidth − 1 and y = y0..y0 + cbHeight − 1.
......
8.4.4 Cross-component chroma intra prediction mode checking process
......
When CclmEnabled is equal to 1 and one of the following conditions is true, CclmEnabled is set equal to 0:
- CbWidth[ 0 ][ xCb64 ][ yCb64 ] and CbHeight[ 0 ][ xCb64 ][ yCb64 ] are both equal to 64, and IntraSubPartitionsModeFlag[ xCb64 ][ yCb64 ] is equal to 1.
- CbWidth[ 0 ][ xCb64 ][ yCb64 ] or CbHeight[ 0 ][ xCb64 ][ yCb64 ] is less than 64, and CqtDepth[ 0 ][ xCb64 ][ yCb64 ] is equal to CtbLog2SizeY − 6.

......

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

Figure 11:
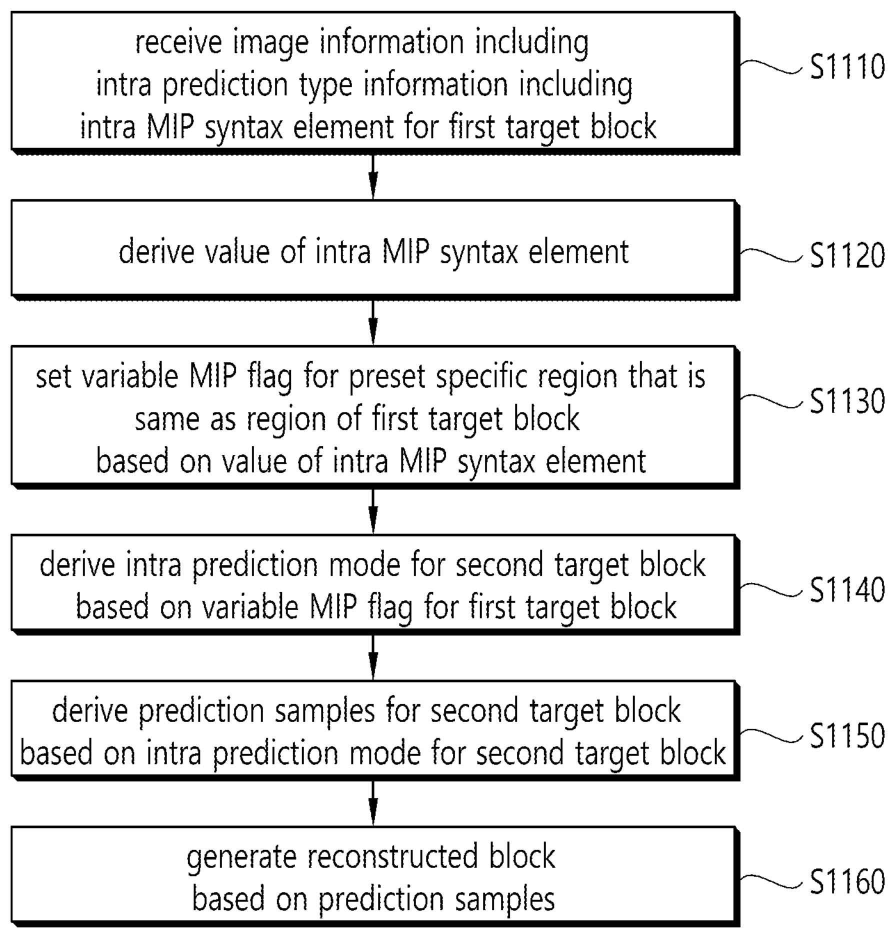
FIG. 11 is a flowchart illustrating an operation of a video decoding apparatus according to an embodiment of the present document.

FIG. 11 is a flowchart illustrating an operation of a video decoding apparatus according to an embodiment of the present document.

Each operation disclosed in FIG. 11 is based on some of the foregoing details explained with reference to FIG. 5 to FIG. 10. Therefore, a description of specific details overlapping with those explained above with reference to FIG. 3 and FIG. 5 to FIG. 10 will be omitted or will be made briefly.

The decoding apparatus 300 according to an embodiment may receive information on an intra prediction mode, residual information, and the like from a bitstream, and may receive, for example, image information including intra prediction type information including an intra MIP syntax element (intra_mip_flag) for a first target block (S1110).

Specifically, the decoding apparatus 300 may decode information on quantized transform coefficients for a current block from the bitstream, and may derive quantized transform coefficients for a target block based on the information on the quantized transform coefficients for the current block. Information on the quantized transform coefficients for the target block may be included in a sequence parameter set (SPS) or a slice header, and may include at least one of information on whether an RST is applied, information on a reduced factor, information on a minimum transform size for applying an RST, information on a maximum transform size for applying an RST, an inverse RST size, and information on a transform index indicating any one of transform kernel matrices included in a transform set.

The decoding apparatus may further receive information on an intra prediction mode for the current block and information on whether an ISP is applied to the current block. The decoding apparatus may receive and parse flag information indicating whether to apply ISP coding or an ISP mode, thereby deriving whether the current block is split into a predetermined number of sub-partition transform blocks. Here, the current block may be a coding block. Further, the decoding apparatus may derive the size and number of split sub-partition blocks through flag information indicating a direction in which the current block is split.

The decoding apparatus 300 may decode the intra MIP syntax element for the first target block, thereby deriving the value of the intra MIP syntax element (S1120).

The decoding apparatus may set a variable MIP flag for a preset specific region that is the same as a region of the first target block based on the value of the intra MIP syntax element (S1130).

As described with reference to Table 6, the variable MIP flag (IntraLumaMipFlag[x][y]) may be set in semantics for the intra MIP syntax element, and may be utilized in a subsequent process for decoding an image.

The specific region may be set to be the same as a region (x=x0 . . . x0+cbWidth and −1, y=y0 . . . y0+cbHeight−1) in which a sample is located in the first target block. Here, cbWidth and cbHeight indicate the width and the height of the first target block.

The variable MIP flag may be set for the specific region based on the tree type of the first target block not being a dual tree chroma. That is, the variable MIP flag may be set as the value of the intra MIP syntax element received for the specific region only when the tree type of the first target block is a single tree or dual tree luma rather than the dual tree chroma.

The intra MIP syntax element intra_mip_flag is signaled only when the tree type of a corresponding coding block is the single tree or dual tree luma, and is not signaled and thus inferred as 0 when the tree type is the dual tree chroma. Accordingly, when the tree type of the first target block is the dual tree chroma, the value of intra_mip_flag is 0. In intra prediction or transform, when an intra prediction mode for a chroma block is derived, an intra prediction mode for a luma block is adopted, in which case a newly set variable MIP flag may be used. When a condition for setting a variable MIP flag does not have a condition that a variable MIP flag is set only in a cases of 'single tree and dual tree luma', the variable MIP flag may also be set in a dual tree chroma. In this case, since the value of intra_mip_flag is 0, the variable MIP flag does not include information on a luma component, and thus luma information cannot be used when deriving the intra prediction mode for the chroma block. To prevent this problem from occurring, the variable MIP flag may be set only when the corresponding coding block, that is, the first target block, is not a dual tree chroma.

The decoding apparatus may derive an intra prediction mode for a second target block based on the variable MIP flag of the first target block (S1140).

Figure 12A:
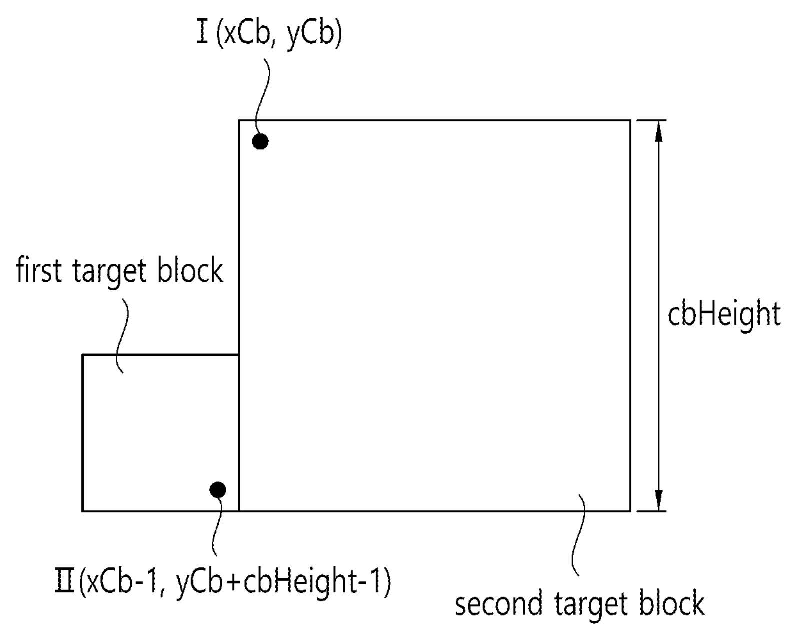
FIG. 12A and FIG. 12B show that a variable MIP flag for a first target block is used to derive an intra prediction mode for a second target block according to an embodiment of the present document.
Figure 12B:
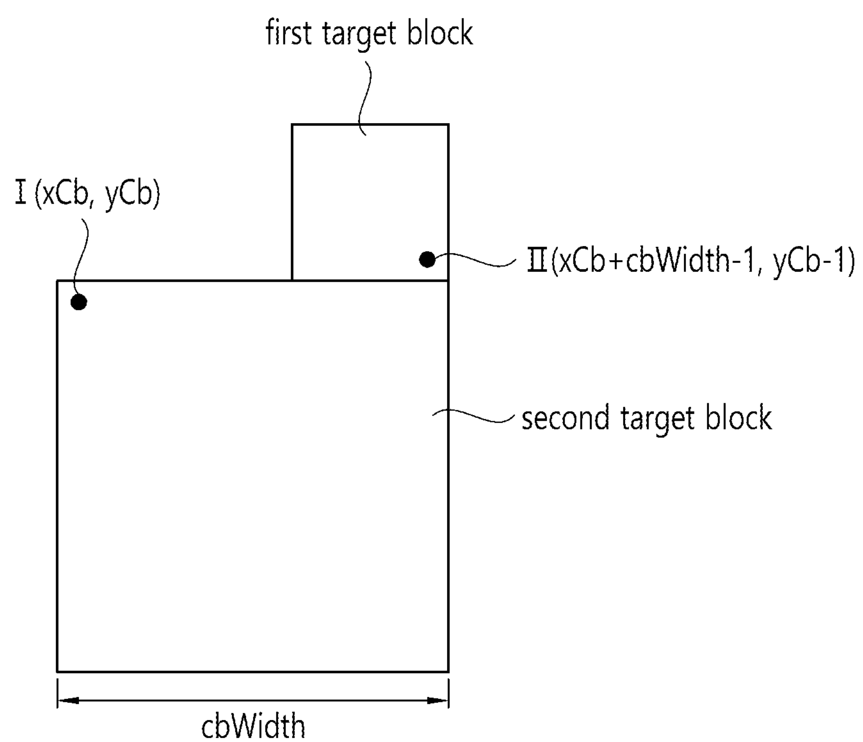

FIG. 12A and FIG. 12B show that the variable MIP flag for the first target block is used to derive the intra prediction mode for the second target block.

As shown in FIG. 12A, the first target block may be a left neighboring block of the second target block, and the specific region may include a sample position of (xCb−1, yCb+cbHeight−1). In this case, (xCb, yCb) is the position of a top-left sample of the second target block, and cbHeight indicates the height of the second target block.

That is, a candidate intra prediction mode for the second target block may be derived based on a variable MIP flag for the sample position of (xCb−1, yCb+cbHeight−1) included in the first target block, that is, the specific region, and an intra prediction mode for the second target block may be derived based on the candidate intra prediction mode.

In another example, as shown in FIG. 12B, the first target block may be a top neighboring block of the second target block, and the specific region may include a sample position of (xCb+cbWidth−1, yCb−1). In this case, (xCb, yCb) is the position of the top-left sample of the second target block, and cbWidth indicates the width of the second target block.

That is, a candidate intra prediction mode for the second target block may be derived based on a variable MIP flag for the sample position of (xCb+cbWidth−1, yCb−1) included in the first target block, that is, the specific region, and an intra prediction mode for the second target block may be derived based on the candidate intra prediction mode.

In still another example, the second target block may include a chroma block, and the first target block may be a luma block related to the chroma block. As described above, an intra prediction mode for the chroma block may be derived based on a variable MIP flag value for the luma block.

In the present document, a picture/image may include a luma component array, and may further include two chroma component (cb, cr) arrays in some cases. That is, one pixel of a picture/image may include a luma sample and a chroma sample (cb, cr).

A color format may indicate a configuration format of a luma component and a chroma component (cb, cr), and may be referred to as a chroma format or a chroma array type. The color format (or chroma format) may be predetermined or may be adaptively signaled. For example, the chroma format may be signaled based on at least one of chroma_format_idc and separate_colour_plane_flag as shown in Table 11.

TABLE 11

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

Figure 13:
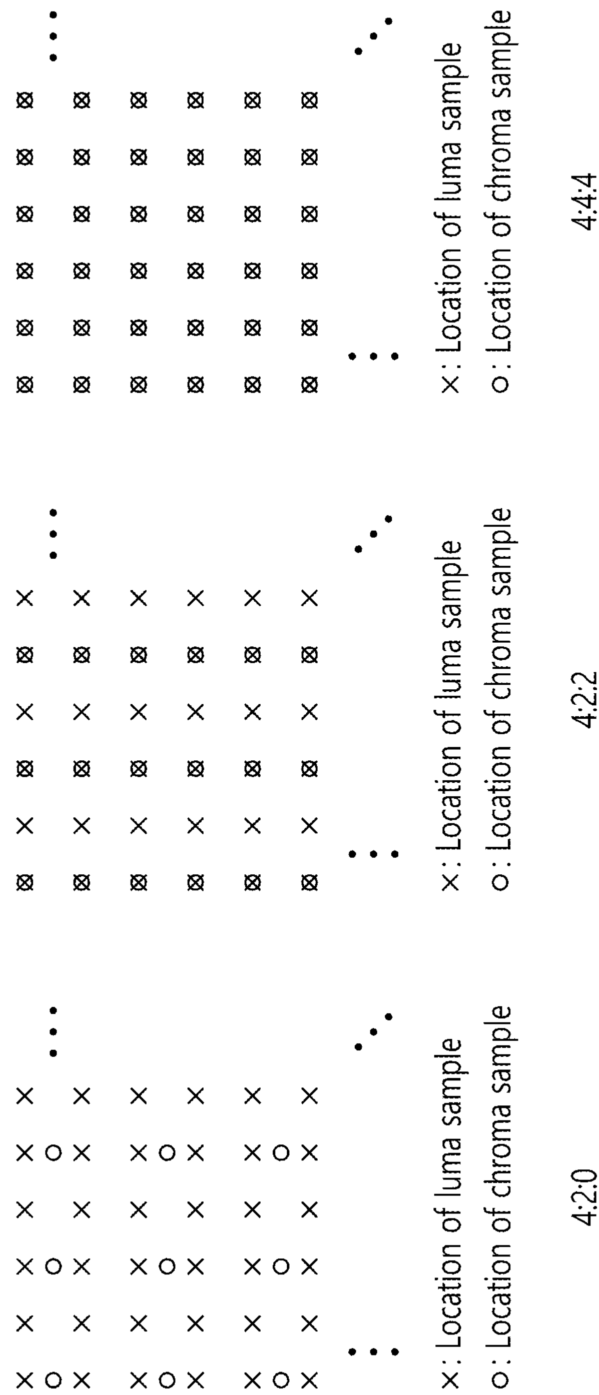
FIG. 13 illustrates a configuration of a sample according to a chroma format.

FIG. 13 shows a configuration of a sample according to the chroma format of Table 11.

4:2:0 sampling with a chroma format index of 1, that is, a chroma array type of 1, indicates that the height and width of two chroma arrays are half the height and width of a luma array, respectively, and 4:2:2 sampling with a chroma format index of 2, that is, a chroma array type of 2, indicates that the height of two chroma arrays is equal to the height of a luma array and the width thereof is half the width of the luma array.

4:4:4 sampling with a chroma format index of 3, that is, a chroma array type of 3, indicates that the height and width of a chroma array are the same as the height and width of a luma array.

According to an example, the specific region may include a sample position of (xCb+cbWidth/2, yCb+cbHeight/2)

based on the tree type of the second target block not being a single tree or the chroma array type thereof not being 3. Here, (xCb, yCb) may indicate the top-left position of a chroma block in luma sample units, cbWidth may indicate the width of a corresponding luma block corresponding to the chroma block, and cbHeight may indicate the height of the corresponding luma block.

Figure 14A:
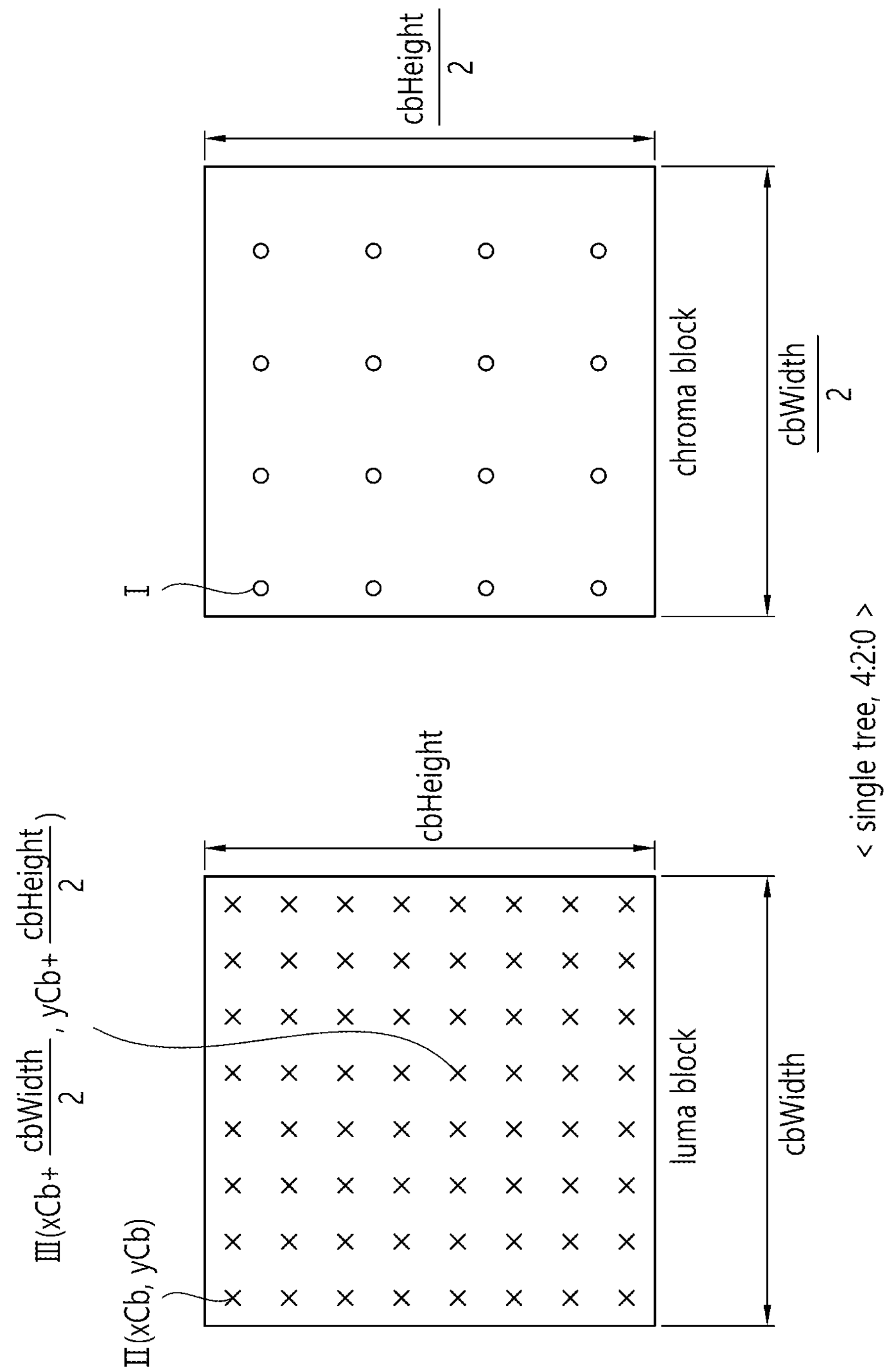
FIG. 14A to FIG. 14C show that a variable MIP flag for a corresponding luma block that is a first target block is used to derive an intra prediction mode for a chroma block that is a second target block according to an embodiment of the present document.
Figure 14B:
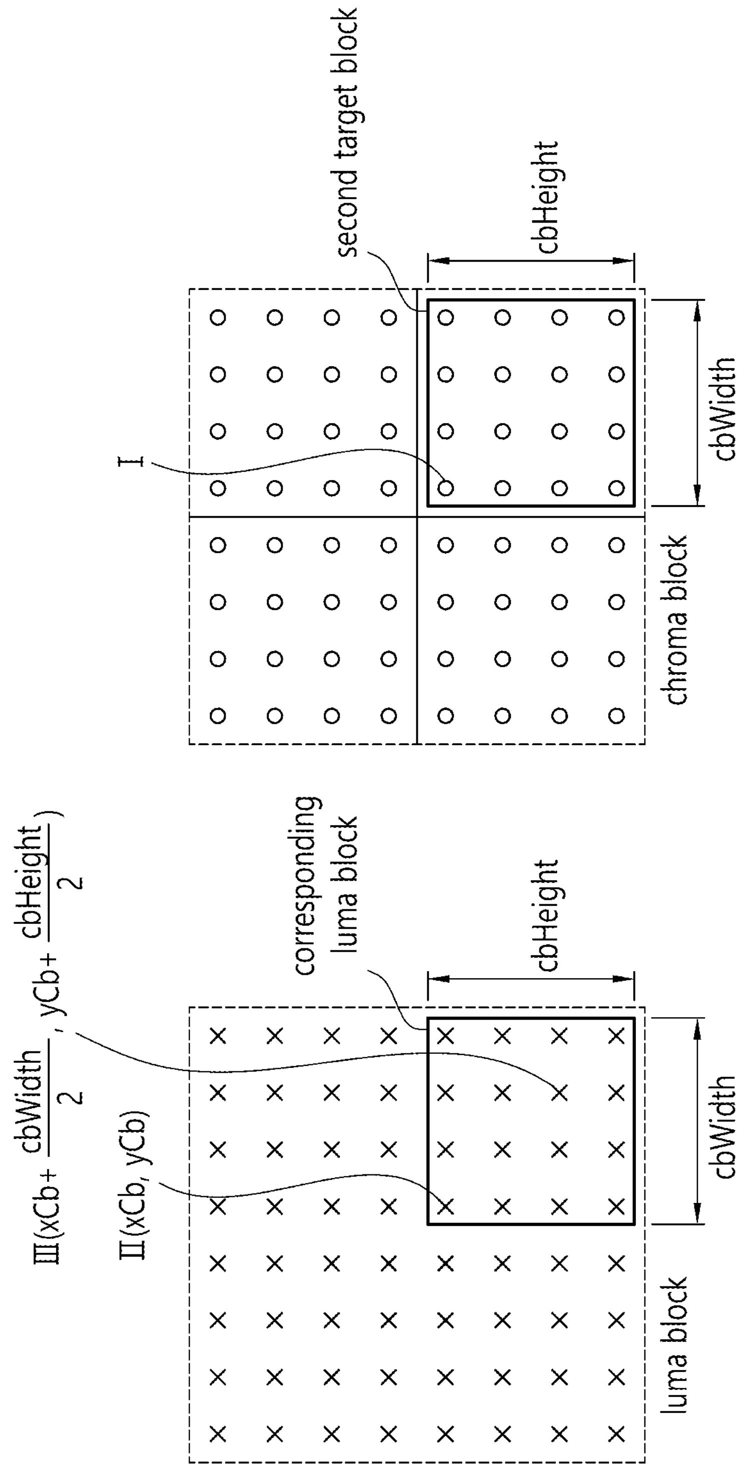
Figure 14C:
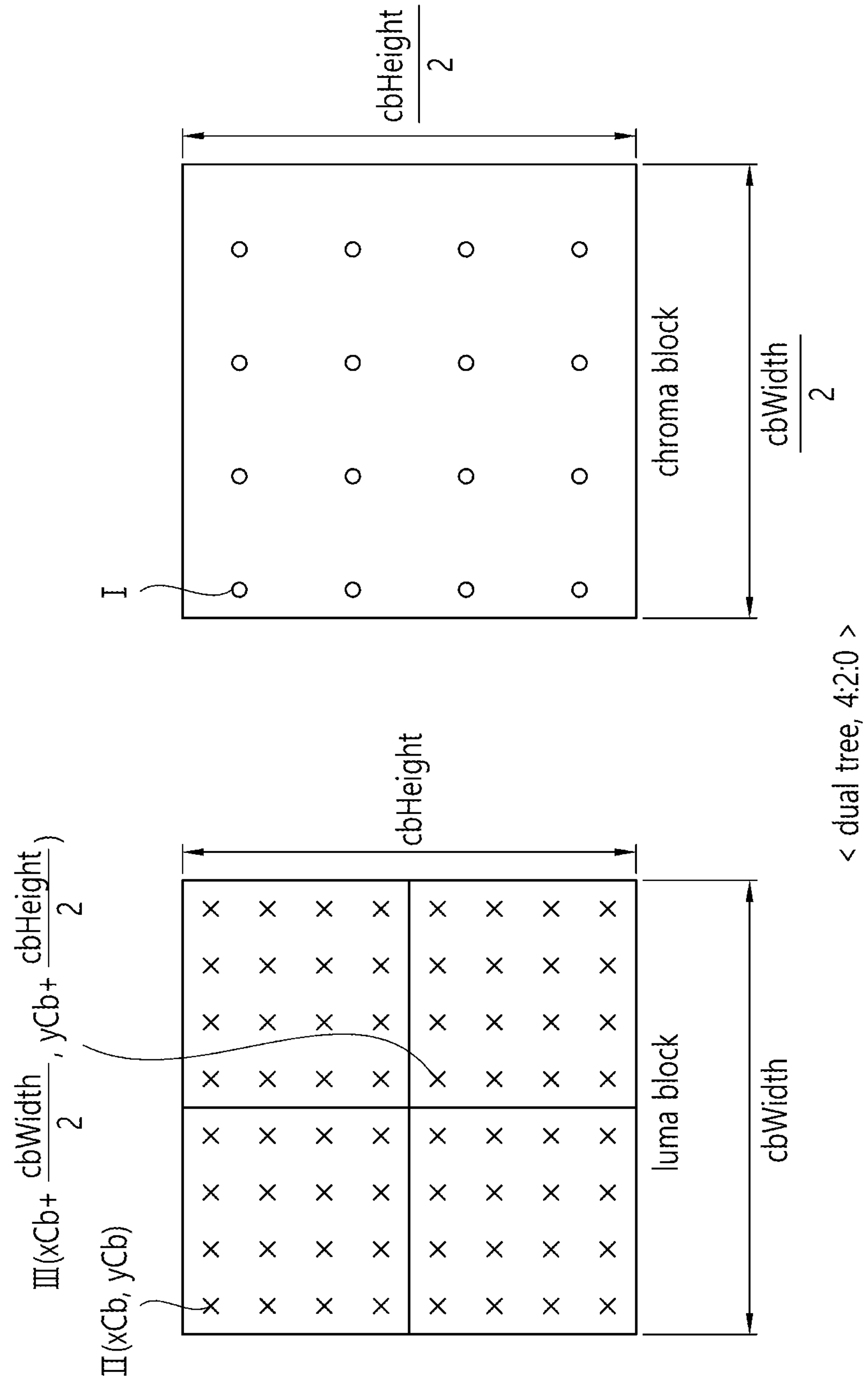

FIG. 14A to FIG. 14C show that a variable MIP flag for the corresponding luma block that is the first target block is used to derive an intra prediction mode for the chroma block that is the second target block. FIG. 14A to FIG. 14C show a sample position of (xCb+cbWidth/2, yCb+cbHeight/2) included in the specific region according to the tree types and color formats of the luma block and the chroma block.

FIG. 14A shows a luma block and a chroma block having a single-tree type and a color format of 4:2:0. That is, FIG. 14A shows a case in which a condition that the chroma array type of the second target block is not 3 is satisfied among a condition that the tree type of the second target block is not a single tree or the condition that the chroma array type of the second target block is not 3.

A first sample position (I) of the chroma block indicates a top-left position of the chroma block, and a second sample position (II(xCb, yCb)) of the luma block indicates the top-left position of the chroma block in luma sample units. cbWidth indicates the width of the corresponding luma block corresponding to the chroma block, and cbHeight indicates the height of the corresponding luma block. Since the color format is 4:2:0, the width and height (cbWidth and cbHeight) of the corresponding luma block corresponding to the chroma block are twice the width and height (cbWidth/2 and cbHeight/2) of the chroma block.

The variable MIP flag value of a third sample position (III) indicated by (xCb+cbWidth/2, yCb+cbHeight/2) in the luma block may be used to derive the intra prediction mode for the chroma block. That is, a candidate intra prediction mode for the chroma block that is the second target block may be derived based on the variable MIP flag of a sample position of (xCb+cbWidth/2, yCb+cbHeight/2) included in the luma block that is the first target block, and an intra prediction mode for the chroma block may be derived based on the candidate intra prediction mode.

FIG. 14B shows a luma block and a chroma block having a dual-tree type and a color format of 4:4:4. That is, FIG. 14B shows a case in which the condition that the tree type of the second target block is not a single tree is satisfied among the condition that the tree type of the second target block is not a single tree or the condition that the chroma array type of the second target block is not 3.

As shown, the chroma block for the luma block indicated by a dotted line is indicated by a dotted line, and since the color format is 4:4:4, the widths and heights of a luma array and a chroma array are the same. Although the luma block is not split, the chroma block is split and coded.

When a bottom-right block of the split chroma blocks is the second target block to be predicted, a first sample position (I) indicates a top-left position of the second target block as shown, and a second sample position (II)(xCb, yCb)) indicates a top-left position of the chroma block in luma sample units.

In addition, since the color format is 4:4:4, a third sample position (III) indicated by (xCb+cbWidth/2, yCb+cbHeight/2) in the luma block is located in the corresponding luma block located at the bottom-right of the luma block.

The decoding apparatus may derive an intra prediction mode for the chroma block based on the variable MIP flag value of the third sample position (III). That is, a candidate intra prediction mode for the chroma block that is the second target block may be derived based on the variable MIP flag of a sample position of (xCb+cbWidth/2, yCb+cbHeight/2) included in the luma block that is the first target block, and an intra prediction mode for the chroma block may be derived based on the candidate intra prediction mode.

FIG. 14C shows a luma block and a chroma block having a dual-tree type and a color format of 4:2:0. That is, FIG. 14C shows a case in which both the condition that the tree type of the second target block is not a single tree and the condition that the chroma array type of the second target block is not 3 are satisfied. In other words, FIG. 14C shows a case where the tree type of the second target block is not a single tree and the chroma array type thereof is not 3.

A first sample position (I) of the chroma block indicates a top-left position of the chroma block, and a second sample position (II(xCb, yCb)) of the luma block indicates the top-left position of the chroma block in luma sample units. cbWidth indicates the width of the corresponding luma block corresponding to the chroma block, and cbHeight indicates the height of the corresponding luma block.

Accordingly, the variable MIP flag value of a third sample position (III) indicated by (xCb+cbWidth/2, yCb+cbHeight/2) in the luma block may be used to derive an intra prediction mode for the chroma block. That is, a candidate intra prediction mode for the chroma block that is the second target block may be derived based on the variable MIP flag of a sample position of (xCb+cbWidth/2, yCb+cbHeight/2) included in the luma block that is the first target block, and an intra prediction mode for the chroma block may be derived based on the candidate intra prediction mode.

The decoding apparatus may derive a prediction sample for the second target block based on the intra prediction mode for the second target block (S1150), and may generate a reconstructed block based on the prediction sample (S1160).

The decoding apparatus may generate a reconstructed block based on the received residual information and the prediction sample. The decoding apparatus may derive a transform coefficient through a transformation process based on the residual information, and may utilize the variable MIP flag value of the first target block when the intra prediction mode for the second target block is required in the transformation process.

According to another example, when the intra prediction type information includes a flag syntax element (intra_subpartitions_mode_flag) for an intra sub-partition (ISP) mode for the first target block, the decoding apparatus may use a variable value set based on the value of intra_subpartitions_mode_flag to derive the intra prediction mode for the second target block.

That is, the decoding apparatus may derive the value of the flag syntax element (intra_subpartitions_mode_flag), may set a variable ISP flag (IntraSubPartitionsModeFlag) for the preset specific region that is the same as the region of the first target block based on the value of the flag syntax element, and may derive the intra prediction mode for the second target block based on the value of the variable ISP flag.

The variable ISP flag may also be set for the specific region based on the tree type of the first target block not being the dual tree chroma. That is, the variable ISP flag may be set as the value of the flag syntax element received for the specific region only when the tree type of the first target block is a single tree or dual tree luma rather than the dual tree chroma.

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

Figure 15:
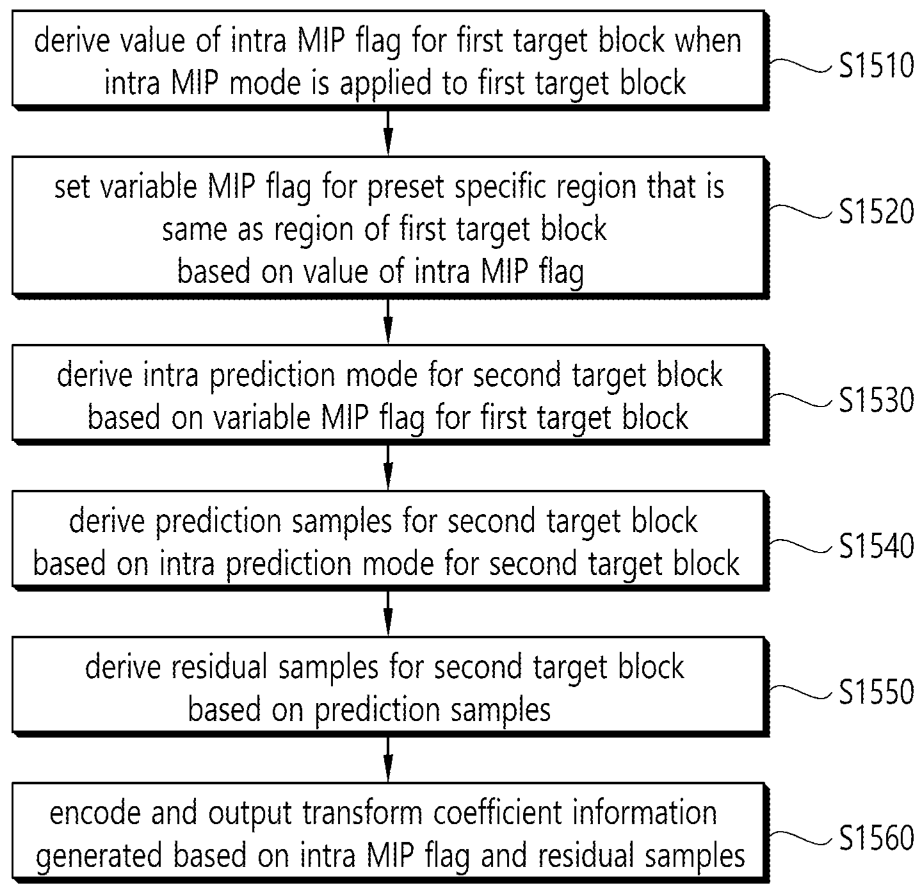
FIG. 15 illustrates an operation of a video encoding apparatus according to an embodiment of the present document.

FIG. 15 is a flowchart illustrating an operation of a video encoding apparatus according to an embodiment of the present document.

Each operation disclosed in FIG. 15 is based on some of the foregoing details explained with reference to FIG. 5 to FIG. 10. Therefore, a description of specific details overlapping with those explained above with reference to FIG. 2 and FIG. 5 to FIG. 10 will be omitted or will be made briefly.

When an intra MIP mode is applied to a first target block, the encoding apparatus 200 according to an embodiment may derive a prediction sample for the first target block and may derive the value of an intra MIP flag for the first target block (S1510).

When ISP is applied to a current block, the encoding apparatus may perform prediction by each sub-partition transform block.

The encoding apparatus may determine whether to apply ISP coding or an ISP mode to the current block, that is, a coding block, may determine a direction in which the current block is split according to a determination result, and may derive the size and number of split subblock.

The same intra prediction mode may be applied to sub-partition transform blocks into which the current block is split, and the encoding apparatus may derive a prediction sample for each sub-partition transform block. That is, the encoding apparatus sequentially performs intra prediction, for example, horizontally, vertically, left to right, or top to bottom, according to the split type of the sub-partition transform blocks. For the leftmost or topmost subblock, a reconstructed pixel of a coding block already coded is used for reference as in a conventional intra prediction method. Further, when each side of a subsequent inner sub-partition transform block is not adjacent to a previous sub-partition transform block, a reconstructed pixel of an adjacent coding block already coded is used for reference to derive reference pixels adjacent to the side as in the conventional intra prediction method.

The encoding apparatus may set a variable MIP flag for a preset specific region that is the same as a region of the first target block based on the value of the intra MIP flag (S1520).

As described with reference to Table 6, the variable MIP flag (IntraLumaMipFlag[x][y]) may be set in semantics for the intra MIP syntax element, and may be utilized in a subsequent process for decoding an image.

The specific region may be set to be the same as a region (x=x0 . . . x0+cbWidth and −1, y=y0 . . . y0+cbHeight−1) in which a sample is located in the first target block. Here, cbWidth and cbHeight indicate the width and the height of the first target block.

The variable MIP flag may be set for the specific region based on the tree type of the first target block not being a dual tree chroma. That is, the variable MIP flag may be set as the value of the intra MIP syntax element received for the specific region only when the tree type of the first target block is a single tree or dual tree luma rather than the dual tree chroma.

The intra MIP syntax element intra_mip_flag is signaled only when the tree type of a corresponding coding block is the single tree or dual tree luma, and is not signaled and thus inferred as 0 when the tree type is the dual tree chroma. Accordingly, when the tree type of the first target block is the dual tree chroma, the value of intra_mip_flag is 0. In intra prediction or transform, when an intra prediction mode for a chroma block is derived, an intra prediction mode for a luma block is adopted, in which case a newly set variable MIP flag may be used. When a condition for setting a variable MIP flag does not have a condition that a variable MIP flag is set only in a cases of 'single tree and dual tree luma', the variable MIP flag may also be set in a dual tree chroma. In this case, since the value of intra_mip_flag is 0, the variable MIP flag does not include information on a luma component, and thus luma information cannot be used when deriving the intra prediction mode for the chroma block. To prevent this problem from occurring, the variable MIP flag may be set only when the corresponding coding block, that is, the first target block, is not a dual tree chroma.

The encoding apparatus may derive an intra prediction mode for a second target block based on the variable MIP flag of the first target block (S1530).

Details described with reference to FIG. 12A to FIG. 14C may be applied to an intra prediction mode derivation process performed by the encoding apparatus.

The encoding apparatus may derive prediction samples for the second target block based on the derived intra prediction mode for the second target block (S1540), and may derive residual samples for the second target block based on the prediction samples (S1550).

Further, as described above, when intra prediction type information on the first target block is an intra sub-partition (ISP) mode, a variable ISP flag value for the first target block may be set based on a flag value indicating whether the intra sub-partition (ISP) mode is performed. An intra prediction mode for the second target block may be derived based on the variable ISP flag value.

The encoding apparatus may encode and output transform coefficient information generated based on the intra MIP flag and the residual samples (S1560).

The encoding apparatus may derive quantized transform coefficients by performing quantization based on modified transform coefficients for the current block, and may generate and output image information including the intra MIP flag.

The encoding apparatus may generate residual information including information on the quantized transform coefficients. The residual information may include information/syntax elements related to the foregoing transformation. The encoding apparatus may encode image/video information including the residual information and may output the encoded image/video information in the form of a bitstream.

Specifically, the encoding apparatus 200 may generate the information on the quantized transform coefficients and may encode the quantized information on the generated transform coefficients.

In the present disclosure, at least one of quantization/dequantization and/or transform/inverse transform may be omitted. When quantization/dequantization is omitted, a quantized transform coefficient may be referred to as a transform coefficient. When transform/inverse transform is omitted, the transform coefficient may be referred to as a coefficient or a residual coefficient, or may still be referred to as a transform coefficient for consistency of expression.

Further, in the present disclosure, a quantized transform coefficient and a transform coefficient may be referred to as a transform coefficient and a scaled transform coefficient, respectively. In this case, residual information may include information on a transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) of the transform coefficients. Residual samples may be derived based on the inverse transform (transform) of the scaled transform coefficients. These details may also be applied/expressed in other parts of the present disclosure.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Claims disclosed herein can be combined in a various way. For example, technical features of method claims of the present disclosure can be combined to be implemented or performed in an apparatus, and technical features of apparatus claims can be combined to be implemented or performed in a method. Further, technical features of method claims and apparatus claims can be combined to be implemented or performed in an apparatus, and technical features of method claims and apparatus claims can be combined to be implemented or performed in a method.

What is claimed is:

1. An image decoding method performed by a decoding apparatus, the method comprising:
- obtaining image information comprising intra prediction type information from a bitstream, the intra prediction type information comprising an intra MIP syntax element for a first coding block, the intra MIP syntax element indicating whether matrix-based intra prediction is applied to the first coding block;
- decoding the intra MIP syntax element;
- setting MIP flag variables for all of samples in the first coding block based on a value of the decoded intra MIP syntax element, respectively, the MIP flag variables corresponding to sample positions of all of the samples in the first coding block, respectively, and the MIP flag variables being set for all of the samples in the first coding block based on a tree type of the first coding block being not a dual tree chroma, respectively;
- deriving an intra prediction mode for a second coding block based on one of the MIP flag variables;
- deriving prediction samples for the second coding block based on the intra prediction mode for the second coding block; and
- generating a reconstructed block based on the prediction samples.

2. The image decoding method of claim 1, wherein the first coding block is a neighboring block of the second coding block, and
- wherein deriving the intra prediction mode for the second coding block comprises:
  - deriving a candidate intra prediction mode based on the one of the MIP flag variables; and
  - deriving the intra prediction mode for the second coding block based on the candidate intra prediction mode.

3. The image decoding method of claim 2, wherein, in response to the first coding block being a left neighboring block adjacent to the second coding block, the one of the MIP flag variables is representative of an MIP flag variable corresponding to a sample position of (xCb−1, yCb+cbHeight−1), and wherein (xCb, yCb) is a top-left sample position of the second coding block, and cbHeight indicates a height of the second coding block.

4. The image decoding method of claim 2, wherein, in response to the first coding block being a top neighboring block adjacent to the second coding block, the one of the MIP flag variables is representative of an MIP flag variable corresponding to a sample position of (xCb+cbWidth−1, yCb−1), and wherein (xCb, yCb) is a top-left sample position of the second coding block, and cb Width indicates a width of the second coding block.

5. The image decoding method of claim 1, wherein the first coding block is representative of a luma block and the second coding block is representative of a chroma block corresponding to the first coding block, and wherein deriving the intra prediction mode for the second coding block comprises:

deriving a corresponding luma intra prediction mode for the first coding block based on the one of the MIP flag variables; and deriving the intra prediction mode for the second coding block based on the corresponding luma intra prediction mode.

6. The image decoding method of claim 5, wherein, in response to a tree type of the second coding block being not a single tree or a chroma array type thereof being not 3, the corresponding luma intra prediction mode is derived based on an MIP flag variable corresponding to a sample position of (xCb+cbWidth/2, yCb+cbHeight/2) among the MIP flag variables, and wherein (xCb, yCb) indicates a top-left sample position of the chroma block, cbWidth indicates a width of the luma block, and cbHeight indicates a height of the luma block.

7. An image encoding method performed by an encoding apparatus, the method comprising:

determining a value of an intra MIP syntax element for a first coding block;

setting MIP flag variables for all of samples in the first coding block based on the value of the intra MIP syntax element, respectively, the MIP flag variables corresponding to sample positions of all of the samples in the first coding block, respectively, and the MIP flag variables being set for all of the samples in the first coding block based on a tree type of the first coding block being not a dual tree chroma, respectively;

determining an intra prediction mode for a second coding block based on one of the MIP flag variables;

deriving residual samples for the second coding block based on prediction samples for the second coding block, the prediction samples being obtained based on the intra prediction mode for the second coding block; and encoding transform coefficient information generated based on the residual samples.

8. The image encoding method of claim 7, wherein the first coding block is a neighboring block of the second coding block, and wherein determining the intra prediction mode for the second coding block comprises:

deriving a candidate intra prediction mode based on the one of the MIP flag variables; and determining the intra prediction mode for the second coding block based on the candidate intra prediction mode.

9. The image encoding method of claim 8, wherein, in response to the first coding block being a left neighboring block adjacent to the second coding block, the one of the MIP flag variables is representative of an MIP flag variable corresponding to a sample position of (xCb−1, yCb+cbHeight−1), wherein, in response to the first coding block being a top neighboring block adjacent to the second coding block, the one of the MIP flag variables is representative of an MIP flag variable corresponding to a sample position of (xCb+cbWidth−1, yCb−1), and wherein (xCb, yCb) is a top-left sample position of the second coding block, and cbHeight and cbWidth indicate a height and a width of the second coding block, respectively.

10. The image encoding method of claim 7, wherein the first coding block is representative of a luma block and the second coding block is representative of a chroma block corresponding to the first coding block, and wherein determining the intra prediction mode for the second coding block comprises:

deriving a corresponding luma intra prediction mode for the first coding block based on the one of the MIP flag variables; and determining the intra prediction mode for the second coding block based on the corresponding luma intra prediction mode.

11. The image encoding method of claim 10, wherein, in response to a tree type of the second coding block being not a single tree or a chroma array type of the second coding block being not 3, the corresponding luma intra prediction mode is derived based on an MIP flag variable corresponding to a sample position of (xCb+cbWidth/2, yCb+cbHeight/2) among the MIP flag variables, and wherein (xCb, yCb) indicates a top-left sample position of the chroma block, cbWidth indicates a width of the luma block, and cbHeight indicates a height of the luma block.

12. A non-transitory computer-readable digital storage medium for storing a bitstream generated by the image encoding method of claim 7.

13. A method comprising:

generating a bitstream based on image information including an intra MIP syntax element for a first coding block, MIP flag variables for all of samples in the first coding block being set based on a value of the intra MIP syntax element, respectively, the MIP flag variables corresponding to sample positions of all of the samples in the first coding block, respectively, and the MIP flag variables being set for all of the samples in the first coding block, respectively, based on a tree type of the first coding block being not a dual tree chroma; and transmitting the data comprising the bitstream, wherein an intra prediction mode for a second coding block is determined based on one of the MIP flag variables, wherein residual samples for the second coding block based on prediction samples for the second coding block, the prediction samples being obtained based on the intra prediction mode for the second coding block, wherein transform coefficient information is generated based on the residual samples, wherein the bitstream is generated from the image information further including the transform coefficient information.

* * * * *